(12) United States Patent
Amako et al.

(10) Patent No.: US 7,885,004 B2
(45) Date of Patent: *Feb. 8, 2011

(54) OPTICAL ELEMENT, LIQUID CRYSTAL DEVICE, AND DISPLAY

(75) Inventors: Jun Amako, Matsumoto (JP); Daisuke Sawaki, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/790,252

(22) Filed: May 28, 2010

(65) Prior Publication Data

US 2010/0238555 A1 Sep. 23, 2010

Related U.S. Application Data

(63) Continuation of application No. 12/187,215, filed on Aug. 6, 2008, now Pat. No. 7,755,718.

(30) Foreign Application Priority Data

Aug. 10, 2007 (JP) .............................. 2007-210244
Jul. 31, 2008 (JP) .............................. 2008-198507

(51) Int. Cl.
G02B 5/30 (2006.01)
G02B 5/18 (2006.01)
G02F 1/1335 (2006.01)

(52) U.S. Cl. .......................... 359/486; 359/569; 349/96

(58) Field of Classification Search ..................... 349/5, 349/8, 9, 96, 201, 202; 359/486, 495, 569, 359/572, 574, 576, 575
See application file for complete search history.

(56) References Cited

U.S. PATENT DOCUMENTS

2005/0141090 A1 6/2005 Huang et al.
2008/0266662 A1 10/2008 Perkins

FOREIGN PATENT DOCUMENTS

JP A-2002-372749 12/2002
JP A-2006-133275 5/2006

*Primary Examiner*—Dung T Nguyen
*Assistant Examiner*—Tai Duong
(74) *Attorney, Agent, or Firm*—Oliff & Berridge, PLC

(57) ABSTRACT

An optical element having a function of splitting incident light into polarized beams includes a substrate transparent for the incident light; a diffractive structure that includes a plurality of concave portions and a plurality of convex portions alternately arranged with each other, each of the plurality of concave portions and convex portions having a rectangular sectional shape and that is provided on a first surface of the substrate; and a grid that includes a plurality of fine lines extending in a single direction and that is provided across a top surface of the diffractive structure on the first surface of the substrate, wherein conditions: $d<\lambda$ and $\lambda/n<\delta\leq\lambda$ are satisfied when $\lambda$ represents a wavelength of the incident light; d represents a distance between the neighboring fine lines; $\delta$ represents a distance between the convex portions; and n represents a refractive index of a material forming the substrate.

7 Claims, 15 Drawing Sheets

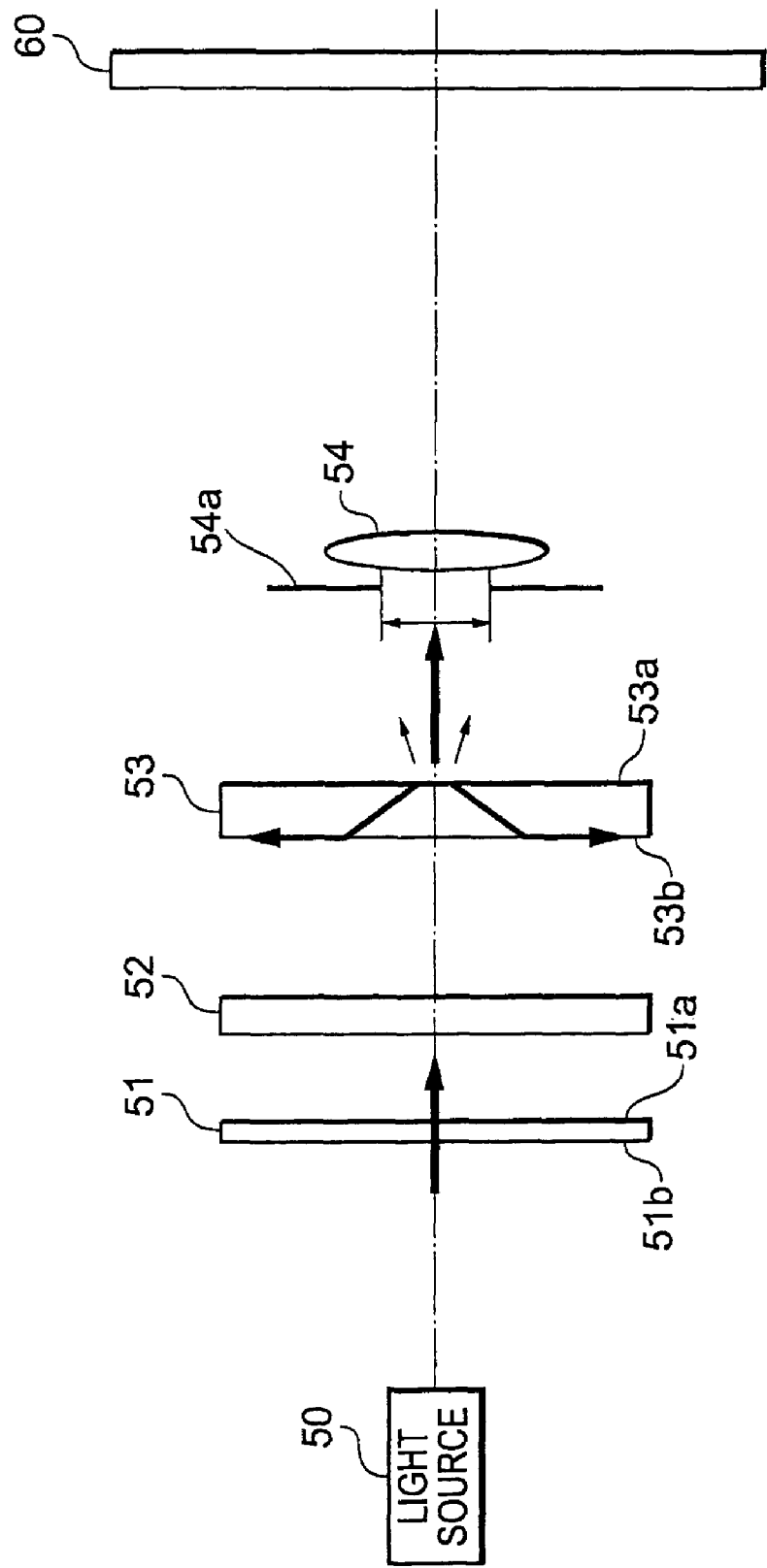

OPTICAL ELEMENT, LIQUID CRYSTAL DEVICE, AND DISPLAY

This is a Continuation of application Ser. No. 12/187,215 filed Aug. 6, 2008. The disclosure of the prior application is hereby incorporated by reference herein in its entirety.

BACKGROUND

1. Technical Field

The entire disclosure of Japanese Patent Application No. 2007-210244, filed Aug. 10, 2007 and Japanese Patent Application No. 2008-198507, filed Jul. 31, 2008, are expressly incorporated by reference herein.

The present invention relates to an optical element having a polarizing beam-splitting function, as well as to a liquid crystal device and a display each using the optical element.

2. Related Art

Among optical elements having a polarized beam splitting function, there is known a polarized beam splitting element of a wire grid type. The wire-grid polarized-beam splitting element includes a large number of fine wires (such as fine lines made of aluminum) arranged on a surface of a glass substrate or the like. The wires are spaced apart from each other by a distance (a cycle) shorter than a wavelength of light. The wire-grid polarized-beam splitting element is characterized by excellent polarized-beam splitting capability, as well as high optical-damage threshold because of an inorganic material forming the element. Thus, use of the wire-grid polarized-beam splitting element in various optical systems is under consideration, as an alternative to conventional polarized beam splitting elements made of polymer. An application example of the wire-grid polarized-beam splitting element is a projection display such as a liquid crystal projector.

In the above projection display, the wire-grid polarized-beam splitting element is arranged on at least one of a front surface and a rear surface of a liquid crystal panel (a liquid crystal light valve). For example, to improve luminance of images displayed on a screen in the projection display, light having a relatively high intensity is input to the liquid crystal panel. However, in principle, the wire-grid polarized-beam splitting element almost totally transmits a TM-polarized component of incident light, whereas almost totally reflects a TE-polarized component of the incident light. Accordingly, there is a concern that the reflected light (the TE-polarized component) returns to the liquid crystal panel, thereby destabilizing operation of the liquid crystal panel. Additionally, such a concern is not restricted to the projection display and shared among various optical devices incorporating the wire-grid polarized-beam splitting element. In any of those optical devices, unnecessary reflected light generated on an optical path is undesirable.

JP-A-2002-372749 is an example of related art.

SUMMARY

An advantage of the present invention is to provide an optical element that enables suppression of negative influence of reflected light.

Another advantage of the invention is to provide a high-performance liquid crystal device including the above optical element.

Still another advantage of the invention is to provide a high-performance display including the above optical device.

An optical element according to a first aspect of the invention has a function of splitting incident light into polarized beams. The optical element includes a substrate transparent for the incident light; a diffractive structure that includes a plurality of concave portions and a plurality of convex portions alternately arranged with each other, each of the plurality of concave portions and convex portions having a rectangular sectional shape, and that is provided on a first surface of the substrate; and a grid that includes a plurality of fine lines extending in a single direction and that is provided along a top surface of the diffractive structure on the first surface of the substrate, wherein the conditions: $d<\lambda$, and $\lambda/n<\delta\leq\lambda$, are satisfied when $\lambda$ represents a wavelength of the incident light; d represents a distance between the neighboring fine lines; $\delta$ represents a distance between the neighboring convex portions; and n represents a refractive index of a material forming the substrate.

In the optical element according to the first aspect, one of polarized components of the incident light is reflected by the grid, whereas the other one of the polarized components is transmitted. The reflected polarized component (the reflected light) is diffracted at a sufficiently large angle by the diffractive structure. Satisfying the relationships among the foregoing parameters allows the diffracted reflected light to be totally reflected at an interface between a second surface of the substrate and a medium surrounding the substrate (such as air). Then, the reflected diffraction light is guided through an inside of the substrate and reach the sides of the substrate. Accordingly, when the optical element of the first aspect is used in a desired optical system, almost all of light reflected by the grid do not return to a preceding stage side on an optical path, thereby inhibiting negative influence of unnecessary reflected light.

Preferably, in the optical device of the first aspect, a height gap between the concave portions and the convex portions of the diffractive structure is set to a value of $(2m+1)\lambda/4n$, where m is an integer, 0 or over. In this case, as mentioned above, $\lambda$ represents the wavelength of the incident light and n represents the refractive index of the material of the substrate.

Satisfying the above condition sufficiently increases diffraction effects on the reflected light by the diffractive structure of the optical element on one hand and sufficiently decrease diffraction effects on the transmitted light (the transmitted polarized component) on the other. Thereby, most of transmitted light includes non-diffracted components, thus further improving light use efficiency.

Preferably, in the optical element of the first aspect, an extending direction of each of the concave and the convex portions of the diffractive structure is approximately parallel to an extending direction of each of the fine lines of the grid. Alternatively, preferably, an extending direction of each of the concave and the convex portions of the diffractive structure intersects an extending direction of each of the fine lines of the grid.

Allowing the concave and the convex portions to intersect the fine lines can further facilitate formation of the fine lines across the transition regions between the concave and the convex portions. An intersection angle is set to an arbitrary angle such as 45 degrees or an angle of a multiple of 45 degrees, such as 90 degrees or 135 degrees.

Preferably, the optical element of the first aspect further includes a light-attenuating portion arranged at the sides of the substrate. The light-attenuating portion may be arranged in contact with the each side of the substrate, or arranged in a position apart from the each side of the substrate. For example, the light-attenuating portion is a dark-colored resin film, an anti-reflective film, or the like.

In this manner, reflected light propagating through the inside of the substrate to reach the side of the substrate is absorbed or released outside, which can reduce intensity of light straying inside the optical element.

Preferably, in the optical element of the first aspect, the condition: $\theta > \tan^{-1}(W/2T)$ is satisfied when T represents a thickness of the substrate in a normal-line direction of the first surface; W represents a width of the substrate in a direction in which first-order diffracted light by the diffractive structure propagates inside the substrate; and $\theta$ represents a diffraction angle between the first-order diffraction and the normal-line direction.

In this manner, of light reflected on the diffractive structure, first-order or higher order diffracted light is diffracted on a second surface of the substrate and then propagates in a width direction of the substrate to reach its sides. Accordingly, the light diffracted on the second surface is not directly incident to the first surface, and thus is not re-diffracted by the diffractive structure. Consequently, no re-diffracted light is returned to a preceding stage side on an optical path, thereby inhibiting negative influence of light returning to the preceding stage side. For example, when the concave portions have a groove-like shape, the width W of the substrate may be defined as a width W of the substrate in a direction orthogonal to an extending direction of the concave portions. Alternatively, for example, when the concave portions have an approximately rectangular concavity and there are a plurality of directions in which the first-order diffracted light propagates the width W of the substrate may be defined by a direction in which the width of the substrate is the shortest among the plurality of directions.

Preferably, the optical device of the first aspect further includes a coverage layer that fills the height gap between the concave portions and the convex portions on the first surface of the substrate and has a refractive index approximately equal to a refractive index of the substrate.

In this manner, transmitted light is hardly diffracted by the diffractive structure, so that most of transmitted light includes non-diffracted components. Thus, light use efficiency can be further increased.

A transmissive (or transmission-type) liquid crystal device according to a second aspect of the invention modulates light incident from a light source to emit. The liquid crystal device includes a first substrate arranged on an incidence side; a second substrate arranged on an emission side so as to oppose the first substrate; a liquid crystal layer provided between the first and the second substrates; and an optical element that has a polarized beam splitting function and that is bonded to an opposite side of the second substrate from the liquid crystal layer via the second substrate and a gap, the optical element being the optical element according to the first aspect.

In the liquid crystal device of the second aspect, light emitted from the liquid crystal layer is split into polarized beams by the optical element, and the light transmitted through the optical element is used to display an image or the like. Additionally, light input to the first surface of the optical element is reflected and diffracted at a sufficiently large angle by a mechanism of the diffractive structure. The reflected light diffracted is totally reflected at an interface between the substrate of the optical element and the gap, propagated through the inside the substrate, and directed toward sides of the substrate. Accordingly, most of reflected light generated by the grid is not re-input to the second substrate and the liquid crystal layer, thereby inhibiting negative influence of unnecessary reflected light. Furthermore, the optical element is bonded to the second substrate via the gap, thereby inhibiting negative influence due to transmission of heat of the optical element to the second substrate.

Preferably, in the liquid crystal device, the second substrate is bonded to the optical element via a sealing member circularly surrounding the gap so as to seal the gap by using the second substrate, the optical element, and the sealing member.

This can prevent dust from entering the gap between the second substrate and the optical element. Consequently, there is no need for dust-proof glass to inhibit shadow-causing dust from entering image light. This enables the liquid crystal device to be miniaturized.

A projection display according to a third aspect of the invention includes a light source such a mercury lamp; a first optical element that has a polarized beam splitting function and is arranged at a succeeding stage side of the light source; a liquid crystal light valve that has an incident-light modulating function and is arranged at a succeeding stage side of the first optical element; a second optical element that has a polarized beam splitting function and is arranged at a succeeding stage side of the liquid crystal light valve; and a projection lens arranged at a succeeding stage side of the second optical element, wherein at least the second optical element is the optical element according to the first aspect, as well as the first surface of the substrate having the diffractive structure and the grid in the second optical element is positioned at the succeeding stage side of the optical element.

Using the optical element of the first aspect as at least the second optical element can prevent light reflected by the grid from entering the liquid crystal light valve. Thus, operation of the liquid crystal light valve is not destabilized by entry of unnecessary light. Specifically, for example, when a thin film transistor is included in the liquid crystal light valve, entry of unnecessary light is likely to cause a malfunction of the thin film transistor, thereby resulting in reduction of display quality or the like. The display of the third aspect prevents the above problem. Additionally, with the grid composed of the metal fine lines, the optical element serves as the polarized beam splitting element. Thus, the display incorporating the optical element has excellent light resistance. Therefore, according to the third aspect, there can be provided a high-performance display.

In the display according to the third aspect, preferably, the first optical element is also the optical element of the first aspect, as well as the first surface having the diffractive structure and the grid in the first optical element is positioned at the succeeding stage side of the optical element.

Using the optical element as the first optical element can prevent return of light reflected by the grid to a preceding stage side on the optical path (such as the light source). In addition, with the grid composed of the metal fine lines, the optical element serves as the polarized beam splitting element. Thus, the display incorporating the optical element has excellent light resistance. Therefore, there can be provided a display with higher performance and higher quality.

Preferably, the display of the third aspect further includes a filed lends arranged at a preceding stage side of the projection lens on the succeeding stage side of the second optical element.

Including the field lens arranged as above enables more transmitted diffracted light to be input to the projection lens. This can further improve brightness of an image displayed.

Preferably, in the display of the third aspect, the light source is a laser.

In the case of a laser light source, a wavelength with of light is extremely small. This can further improve light controllability by the optical element of the first aspect. As a result, the display can provide better quality display images.

BRIEF DESCRIPTION OF THE DRAWINGS

The invention will be described with reference to the accompanying drawings, wherein like numbers reference like elements.

FIG. 14 is a schematic view showing a structural example of a projection display according to an embodiment of the invention.

DESCRIPTION OF EXEMPLARY EMBODIMENTS

Figure 1:
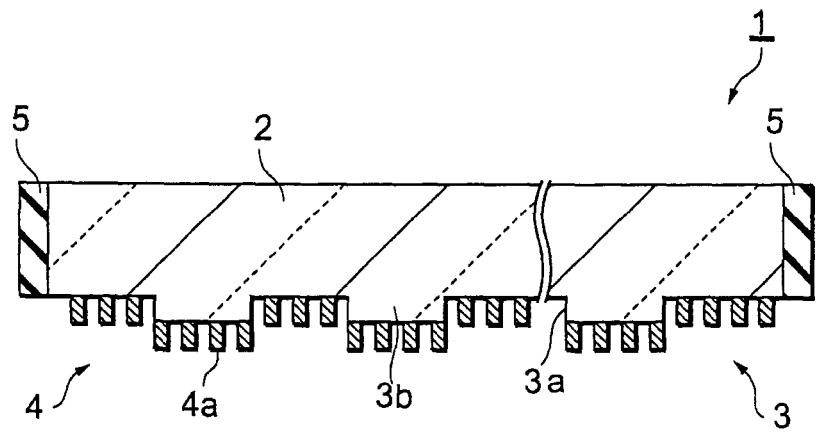
FIG. 1 is a schematic view showing a sectional structure of an optical element according to a first embodiment of the invention.

Hereinafter, embodiments of the invention will be described with reference to drawings. In the drawings, sizes and ratios of respective elements are appropriately different from actual ones thereof to make the elements more recognizable in the drawings.

FIG. 1 schematically shows a sectional structure of an optical device according to a first embodiment of the invention. An optical element 1 of the first embodiment shown in FIG. 1 includes a substrate 2, a diffractive structure 3, a grid 4, and a light-attenuating portion 5. The optical element 1 has a function of splitting incident light into polarized beams by using the grid 4.

The substrate 2 is transparent at wavelength of the incident light. For example, the substrate 2 is made of an inorganic material such as glass and has a thickness of approximately 0.7 mm. Provided on a first surface of the substrate 2 is the diffractive structure 3. In addition, a second surface of the substrate 2 is a flat surface, as shown in the drawing.

The diffractive structure 3, which is provided on the first surface of the substrate 2, includes a plurality of concave portions 3a and a plurality of convex portions 3b, where those portions 3a and 3b are alternately arranged. In FIG. 1, for descriptive convenience, respective reference numerals are given to a single one of the concave portions 3a and a single one of the convex portions 3b, respectively. The diffractive structure 3 with the concave and the convex portions 3a and 3b has a rectangular sectional shape, as shown in the drawing. Alternatively, the sectional shape of the diffractive structure 3 may be slightly tapered. In the present embodiment, the diffractive structure 3 is formed by processing the first surface of the substrate 2. In short, the diffractive structure 3 is part of the substrate 2.

The grid 4 is provided across an upper surface of the diffractive structure 3 on the first surface of the substrate 2. The grid 4 includes a plurality of fine lines (fine wires) 4a extending in a single direction. In the drawing, for descriptive convenience, reference numeral 4a is given to only a single fine line. For example, each of the fine lines 4a is composed of a metal such as aluminum.

Figure 2:
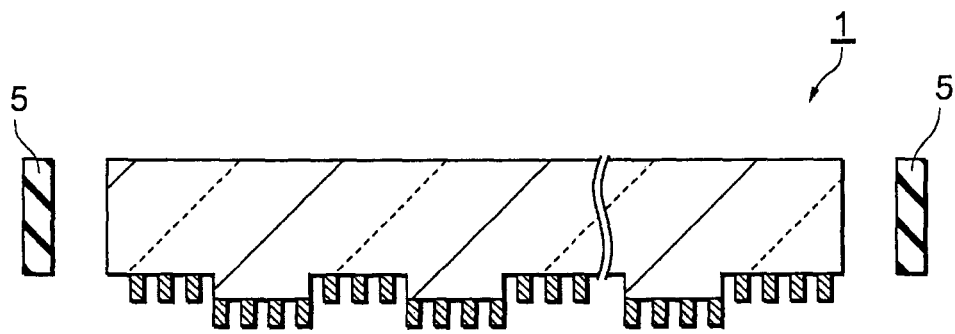
FIG. 2 is a schematic view showing a sectional structure of a modification of the optical element according to the first embodiment of the invention.

The light-attenuating portion 5 is provided at each side of the substrate 2. The light-attenuating portion 5 may be composed of a dark-colored resin film. Diffracted light incident to the light-attenuating portion 5 is totally reflected at an interface between the second surface of the substrate 2 and air. The light-attenuating portion 5 absorbs the diffracted light input thereto or attenuates intensity of the light. As shown in FIG. 2, the light-attenuating portion 5 may be arranged in a position apart from the each side of the substrate 2, instead of being contacted with the each end thereof.

Figure 3:
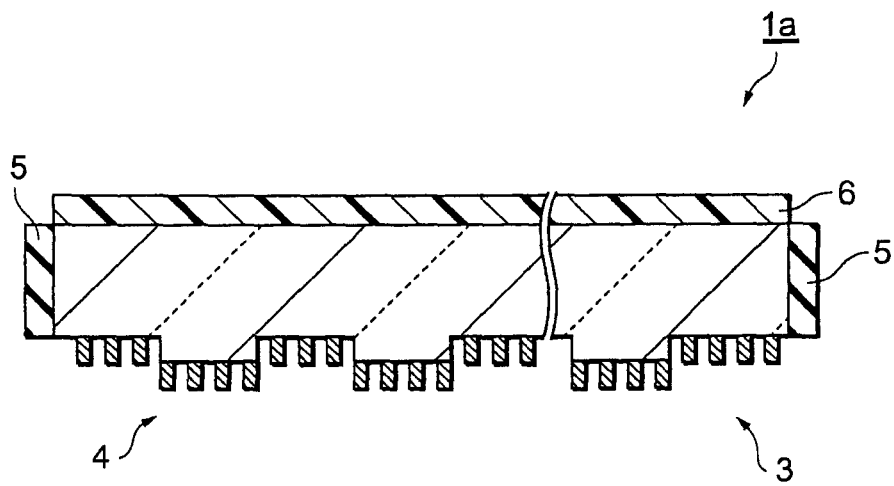
FIG. 3 is a schematic view showing a sectional structure of an optical element according to a modification of the first embodiment.

FIG. 3 is a schematic sectional view illustrating an optical element according to a modification of the first embodiment. An optical element 1a shown in FIG. 3 has the same structure as that of the optical element 1 in FIG. 1, and further includes an anti-reflective film 6. For example, the anti-reflective film 6 is a multilayered dielectric film. Constituent elements other than the anti-reflective film 6 are given the same reference numerals as those in the optical element 1 in FIG. 1 and descriptions thereof are omitted. Including the anti-reflective film 6 reduces light reflection at the second surface of the substrate 2.

Figure 4:
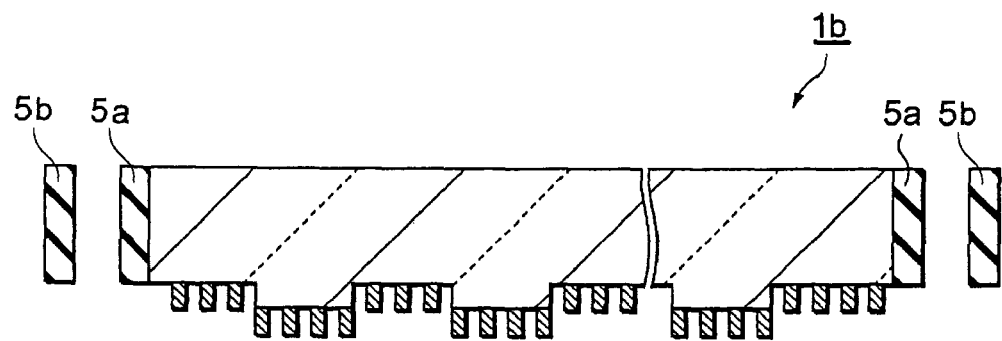
FIG. 4 is a schematic view showing a sectional structure of an optical element according to another modification of the first embodiment.

FIG. 4 is a schematic sectional view illustrating an optical element according to a third embodiment of the invention. An optical element 1b shown in FIG. 4 has the same structure as that of the optical element 1 in FIG. 1, and further includes an anti-reflective film such as an anti-reflective coating film (an AR film). The anti-reflective film is provided as a light-attenuating portion 5a at each end of the substrate 2. Additionally, the optical element 1 further includes a light absorbing member 5b that absorbs light passing through the light-attenuating portion 5a. Providing the above-said anti-reflective film allows light reflectance to be significantly reduced at the interface between the each end of the substrate 2 and air. Thereby, the intensity of light reflected at the interface therebetween is attenuated as compared with that before reflection. This significantly reduces re-incidence of the light reflected back at the interface of the each end to the grid 4. Additionally, the light passing through the light attenuation portion 5a is absorbed by the light absorbing member 5b, thereby preventing the light from becoming stray light. The light absorbing member 5b may have a cooling mechanism such as a heat-radiating plate, which can control and release heat generated by the light absorbed.

Figure 5:
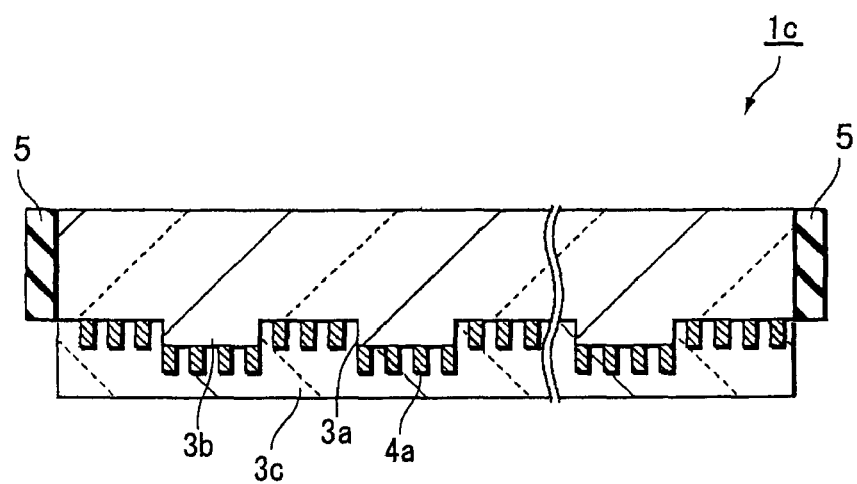
FIG. 5 is a schematic view showing a sectional structure of an optical element according to another modification of the embodiment.

FIG. 5 is a schematic sectional view of an optical element according to a fourth embodiment of the invention. An optical element 1c shown in FIG. 5 has the same structure as that of the optical element 1 in FIG. 1, and further includes a coverage film 3c provided on a side of the substrate 2 having the diffractive structure 3 formed thereon. The coverage film 3c fills the height gap between the concave and the convex portions 3a and 3b and is arranged so as to cover the concave and the convex portions 3a, 3b and the fine lines 4a. The flattening film 3c is formed by depositing a film of spin-on-glass (SOG), polysilazane, or the like, by using a liquid phase process such as a coating process. The coverage film 3c has a refractive index approximately equal to that of the substrate 2, so that light transmitting through the optical element 1b is not influenced by the height gap between the concave and the convex portions 3a and 3b. Thereby, the light transmitting through the optical element 1b is hardly diffracted, thus enabling light use efficiency to be improved.

Figure 6:
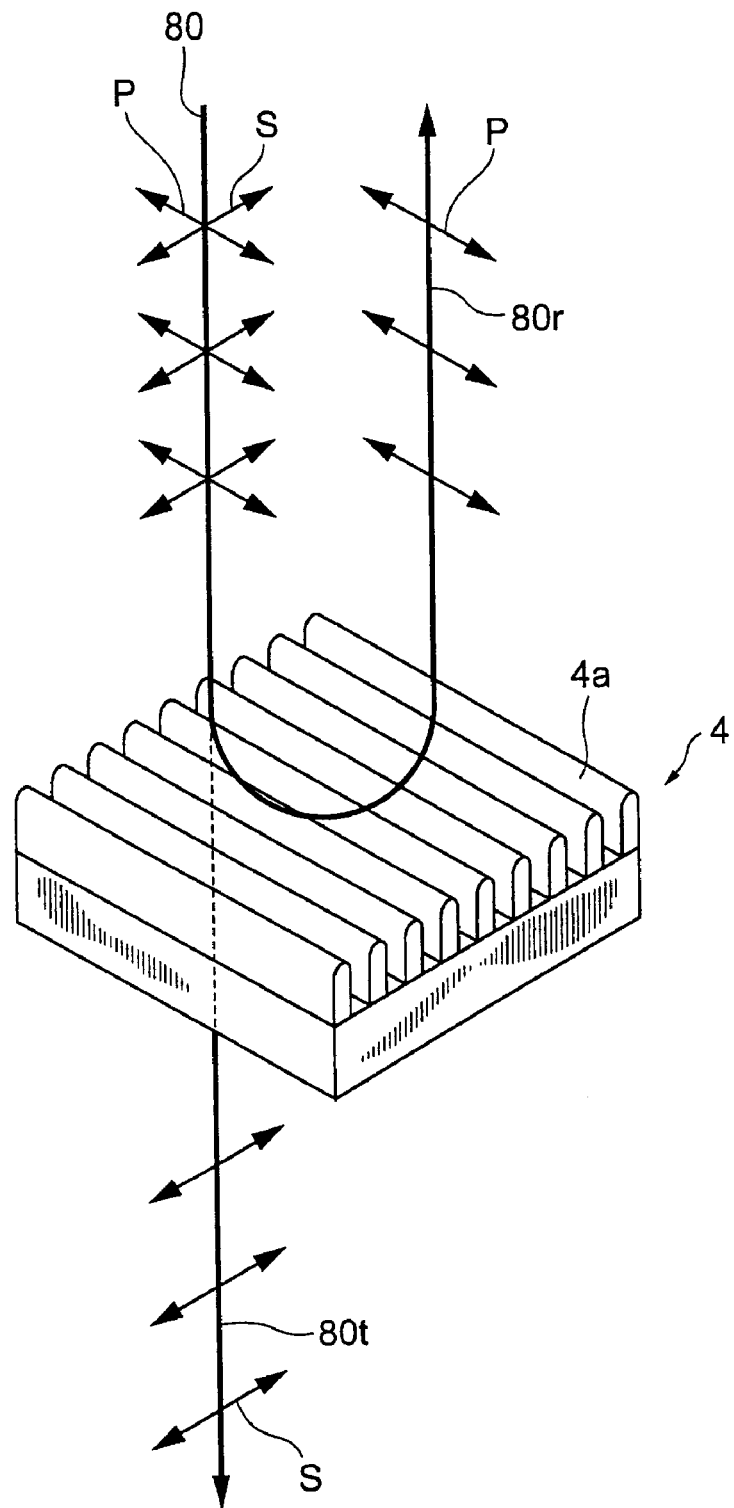
FIG. 6 is a schematic perspective view showing a partially enlarged portion of a grid.

FIG. 6 is a schematic perspective view showing an enlarged portion of the grid 4. A function of the grid 4 will be described with reference to FIG. 6. Of a light beam 80 incident to the grid 4, the grid 4 reflects a component p (a transverse electric (TE)-polarized component) having a polarization axis parallel to an extending direction of the fine lines 4a (a long-axis direction), and transmits a component s (a transverse magnetic (TM)-polarized component) having a polarization axis orthogonal to the extending direction of the fine lines 4a. In short, the grid 4 has a function of splitting the incident light beam 80 into a reflected light beam 80r and a transmitted light beam 80t that have mutually different polarized states (a polarizing beam splitting function). In the optical element 1 of the first embodiment, the grid 4 having the polarizing beam splitting function is disposed on the first surface of the substrate 2.

Figure 7A:
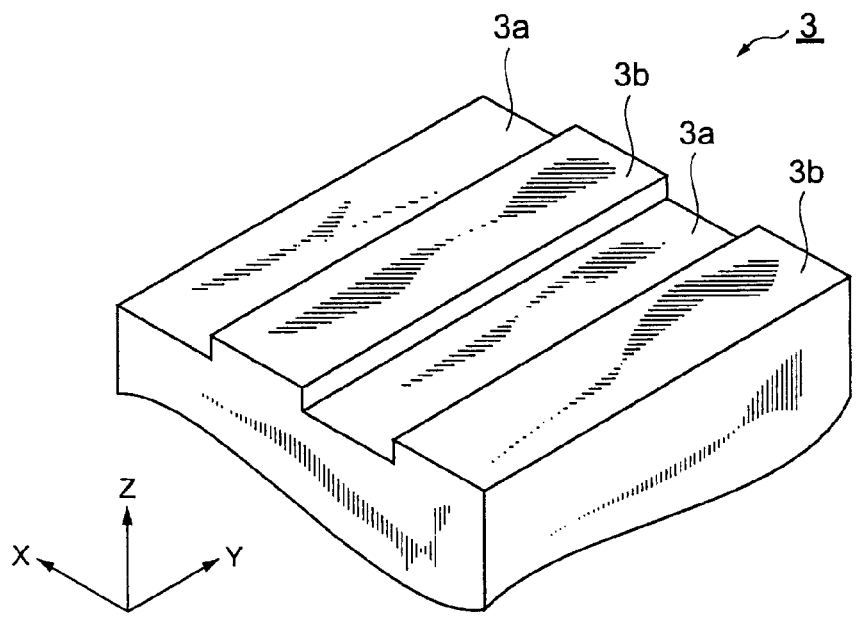
FIGS. 7A and 7B are each a schematic perspective view of an enlarged portion of a diffractive structure.
Figure 7B:
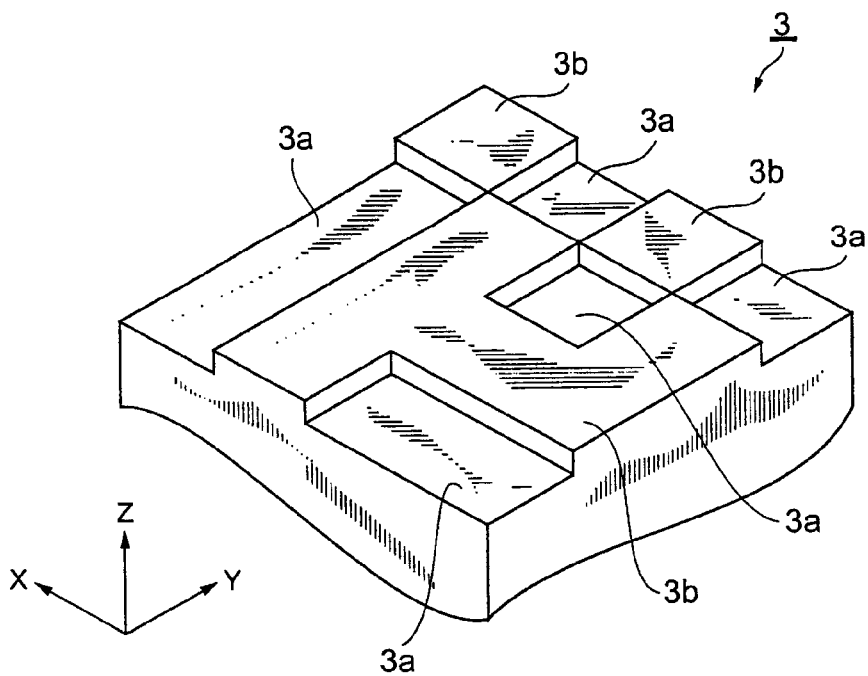

FIGS. 7A and 7B are each a schematic perspective view showing an enlarged portion of the diffractive structure 3. As shown in FIG. 7A, the diffractive structure 3 includes the concave portions 3a and the convex portions 3b extending in a single direction (a Y direction shown in each of the drawings). The concave and the convex portions 3a and 3b are stripe-shaped as shown in the drawings and cyclically arranged in an X direction. The arrangement of the concave and the convex portions 3a and 3b is not restricted to a one-dimensional pattern as in FIG. 7A. For example, the portions 3a and 3b may be two-dimensionally arranged as in FIG. 7B.

Figure 8:
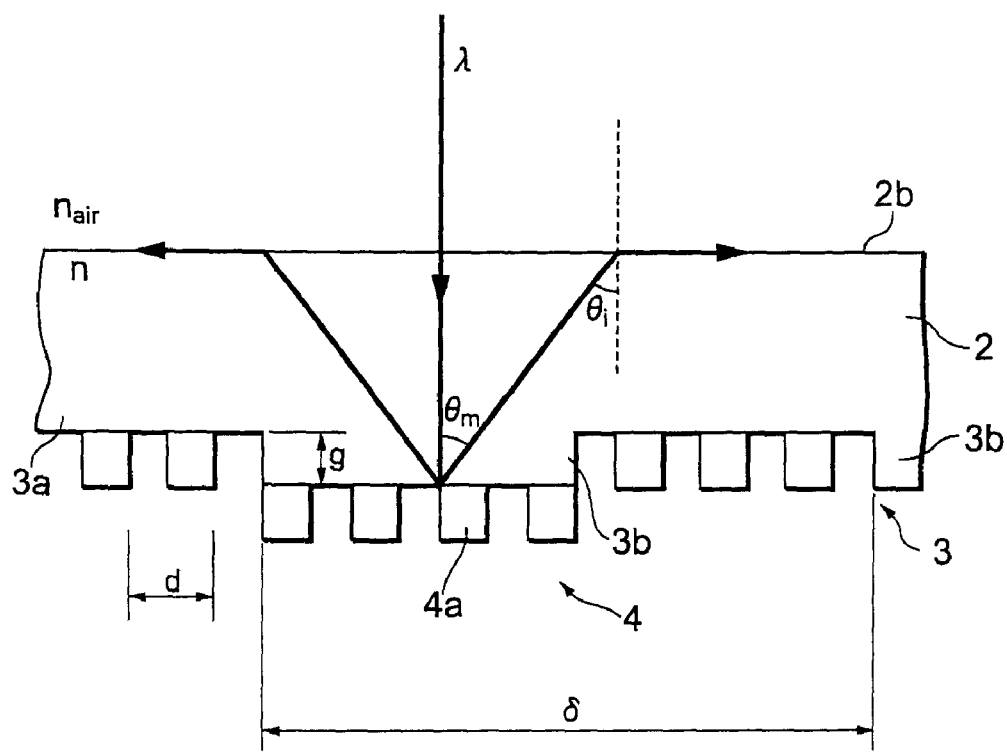
FIG. 8 is a schematic sectional view showing a partially enlarged portion of the diffractive structure with the grid.

FIG. 8 is a schematic sectional view showing an enlarged portion of the diffractive structure 3 and the grid 4. With reference to FIG. 8, a structure of the diffractive structure 4 with the grid 4 will be described in more detail. As shown in the drawing, it is assumed that δ (nm) represents a distance between the respective convex portions 3b of the diffractive structure 3 (a cycle of a concave and convex structure); d (nm) represents a distance between the respective fine lines 4a of the grid 4 (a grid cycle); λ (nm) represents a wavelength of incident light; n represents a refractive index of a material forming the substrate 2; and nair (=1) represents a refractive index of air around the substrate 2. In the optical element 1 of the present embodiment, a relationship between the wavelength λ of the incident light and the structure of the diffractive structure with the grid is represented defined as follows:

$$d<\lambda \text{ and } \lambda/n<\delta\leq/\lambda \tag{1}$$

For example, when the wavelength of the incident light λ is 600 nm and the refractive index n of the material of the substrate 2 is 1.5 (a case of $SiO_2$, for example), the relationship (1) can be satisfied, for example, by setting the grid cycle d to 140 nm and a cycle of the convex and concave structure δ to 600 nm. Additionally, in case of disposing a member around the substrate 2, a ratio of the refractive index of the material of the substrate 2 with respect to a refractive index of the member disposed can be set to n (>1) to determine the grid cycle and the cycle of the convex and concave structure. Light incident to the optical element 1 structured as above from the second surface 2b of the substrate 2 is split into polarized light beams by the grid 4. Specifically, as described above, the TE-polarized component is reflected, whereas the TM-polarized component is transmitted through the substrate 2. Along with this, by means of a mechanism of the diffractive structure 3, the TE-polarized component is diffracted at a large angle. The TE-polarized component diffracted is totally reflected at the interface between the air and the substrate 2 and thereby is propagated inside the substrate 2 to reach the sides of the substrate 2. As described above, when the light-attenuating portion 5 is provided with the substrate 2, the light-attenuating portion 5 absorbs the TE-polarized light propagating inside the substrate 2 or reduces intensity of the light. Hereinbelow, a detailed description will be given of the conditions under which the TE-polarized component diffracted is totally reflected at the interface between the substrate 2 and air, namely the conditions of the above expression (1):

A. Derivation of a Relation: λ/n<δ

To allow m-th order diffracted light to exist inside the substrate 2, a following condition should be satisfied:

$$\sin \theta_m = m\lambda/(n\delta) < 1 \tag{2}$$

In the above condition, θm represents a diffraction angle inside the substrate 2, as shown in the drawing. In addition, as mentioned above, λ represents the wavelength of the incident light in air; n represents the refractive index of the material of the substrate 2; and δ represents the cycle of the concave and convex structure. Assuming that all diffracted light is confined inside the substrate 2, a diffraction order m is set to 1 in the condition (2). Thereby, a condition (3) will be derived as below:

$$\lambda/n<\delta \tag{3}$$

B. Derivation of a Relation: δ=λ

To confine the m-th order diffracted light inside the substrate 2, the diffraction angle θm should be larger than a critical angle θc (an angle at which total reflection occurs), namely, an incident angle θi of the m-th order diffracted light at the interface between the substrate 2 and air should be larger than the critical angle θc. To this end, a following relation should be satisfied.

$$\sin \theta_m = m\lambda/(n\delta) \geq \sin \theta_c \tag{4}$$

Assuming that all diffracted light is confined inside the substrate 2, the diffraction order m is set to 1 in the relation (4). Thereby, a following relation (5) will be derived.

$$\delta \leq \lambda/(n \sin \theta c) \quad (5)$$

Under the conditions of total reflection to take place, n sin θc is equal to 1. Thus, the above relation (5) will be as follows:

$$\delta \leq \lambda \quad (6)$$

From the above requirements (3) and (6), a relation: $\lambda/n < \delta \leq \lambda$ will be derived.

Preferably, a diffraction angle θm of first-order diffracted light coincides with the critical angle θc. Specifically, it will be as follows:

$$\sin \theta m = m\lambda/(n\delta) = \sin \theta c \quad (7)$$

Under the conditions of total reflection, n sin θc is equal to 1. Thus, m is set to 1 and then, the relation (7) will be as follows:

$$\delta = \lambda \quad (8)$$

That is, when the wavelength λ of the incident light is set equal to the cycle δ of the concave and convex structure of the diffractive structure 3, the 1-st-order diffraction angle θ1 coincides with the critical angle θc.

The above has described the case where an incident medium is air. When the incident medium is not air, a condition for confinement of the m-th order diffracted light inside the substrate 2 will be as follows:

Even when the incident medium is other than air, the diffraction angle θm should be larger than the critical angle θc to confine the m-th order diffracted light inside the substrate 2. Thus, the above conditions (4) and (5) should be satisfied. In the case of the incident medium other than air, the condition for total reflection is represented by an expression: n sin θc=ns, by using a refractive index ns of the incident medium. Thus, from the condition for total reflection and the requirement (5), a following relation will be derived:

$$\delta \leq m\lambda/ns \quad (9)$$

In this manner, when the incident medium is not air, using the expression (9) enables determination of an upper limit of the cycle of the concave and convex structure. That is, when m is set to 1 in the condition (9), a relation: $\delta \leq \lambda/ns$ should be obviously satisfied.

Next will be described a suitable condition regarding a depth of the concave and convex structure (the level difference between the concave and the convex portions 3a and 3b) of the diffractive structure 3. As shown in FIG. 8, g represents the depth of the concave and convex structure. There is also assumed a situation in which light incident to the optical element 1 is vertical to the second surface 2b of the substrate 2. Additionally, an intensity of the m-th order diffracted light in an intensity of polarized light reflected on the second surface 2b is assumed to indicate an m-th order diffraction coefficient.

A zero-order diffracted component of the TE-polarized component is retro-reflected out of the optical element 1 propagating along the same optical axis as that of the incident light. From a practical point of view, the above-said retro-reflection should be as small as possible, and therefore, a zero-order diffraction intensity of the TE-polarized component needs to be minimized. When the cycle of the concave and convex structure is assumed to be sufficiently larger than the wavelength of the incident light, that is, a scalar approximation, the polarization dependency of diffraction characteristics is negligible. The depth g (hereinafter referred to as "gh" for convenience) at the minimum zero-order diffraction efficiency is represented by a following expression regarding both of the TE-polarized component and the TM-polarized component.

$$gh = \lambda/4n \quad (10)$$

Meanwhile, when the cycle of the concave and convex structure is approximately equal to or less than the wavelength, the polarization dependency of the diffraction efficiency becomes so large that diffraction characteristics needs to be analyzed rigorously.

Figure 9A:
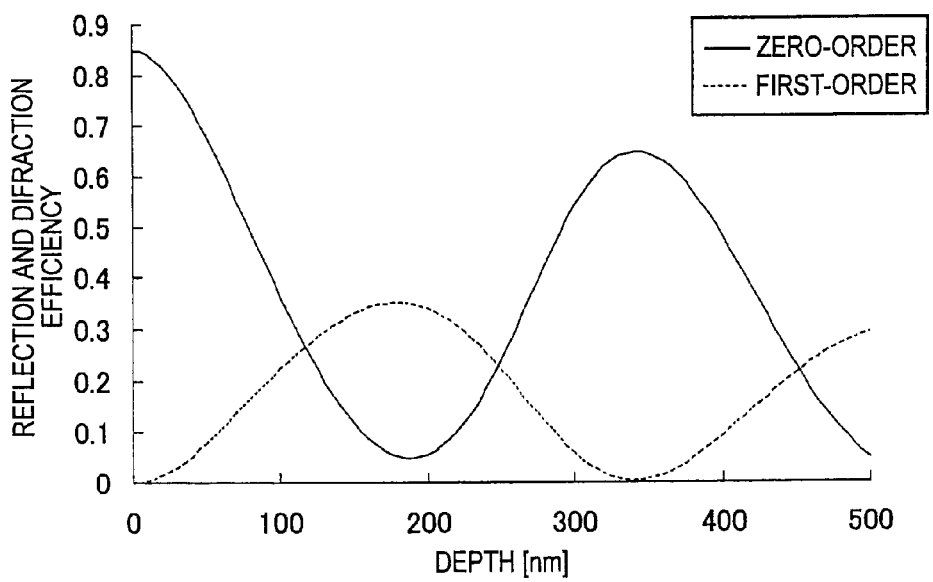
FIGS. 9A and 9B are each a graph showing diffraction efficiencies with respect to a depth of a diffractive structure.
Figure 9B:
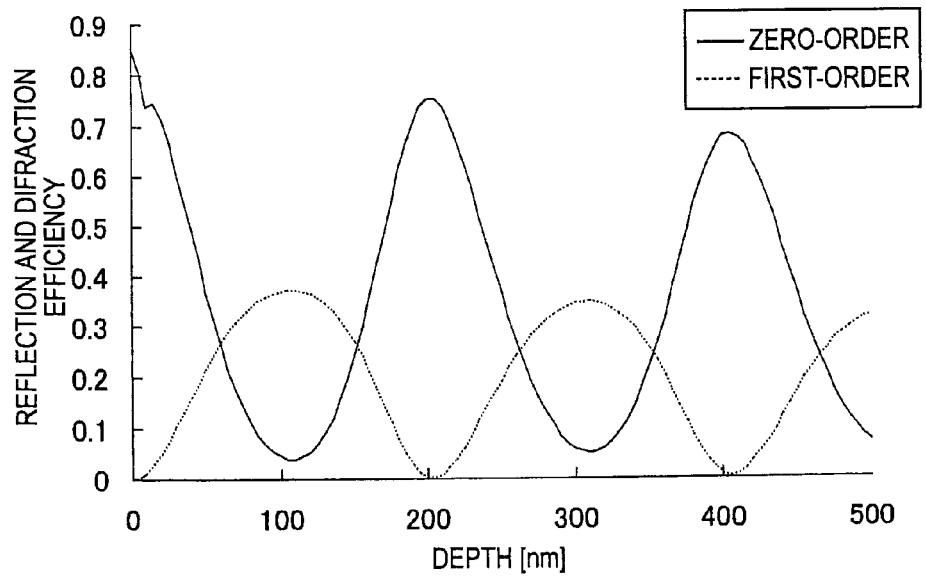

FIGS. 9A and 9B show the results of rigorous computation of the diffraction efficiencies with respect to the depth of the concave and convex structure by using a rigorous coupled-wave analysis with polarization considered. FIG. 9A shows the diffraction efficiency of the TE-polarized component approximately vertically incident to the second surface 2b, and FIG. 9B shows the diffraction efficiency of the TM-polarized component approximately vertically incident to the second surface 2b. In this case, FIGS. 9A and 9B each indicate an example solution obtained when λ is equal to 633 nm and n is equal to 1.46.

As the value of g at which the zero-order diffraction efficiency of the TE-polarized component is a minimum, a value g calculated by the relation (10) is approximately 108 nm, whereas a value obtained by the graph of FIG. 9A is approximately 190 nm.

A value g at the minimum zero-order diffraction efficiency of the TM-polarized component is approximately 108 nm based on the relation (10), whereas the value g is approximately 100 nm from the graph of FIG. 9B.

As described above, when the cycle of the concave and convex structure is approximately equal to or smaller than the wavelength, it is obvious that the value g can be determined based on the vector analysis.

A following equation approximately provides the depth g (hereinafter referred to as "gr" for convenience) at which reflective diffraction intensities take maximums:

$$gr = (2m+1)\lambda/4n: m=0,1,2 \quad (11)$$

On the other hand, a following equation approximately provides the depth g (hereinafter referred to as "gt" for convenience) at which transmissive diffraction intensities take maximums:

$$gt = (2m+1)\lambda/2(n-1): m=0,1,2 \quad (12)$$

From the above equations (11) and (12), it is found that the depth gr at a maximum reflective diffraction is different from the depth gt at a maximum transmissive diffraction. Thus, at the depth g of the diffractive structure with the value gr the transmissive diffractions can be sufficiently suppressed. For example, with λ of 600 nm, gr is 100 nm and gt is 600 nm with respect to m of 0. In this case, the refractive index n is assumed to be 1.5. Thus, for example, assuming that the depth g of the diffractive structure 3 is set to 100 nm equal to gr, 96% of transmitted light can become a non-diffracted component. For example, when a lens is arranged at a succeeding stage of the optical element 1, almost all light can be used by the lens.

Figure 10A:
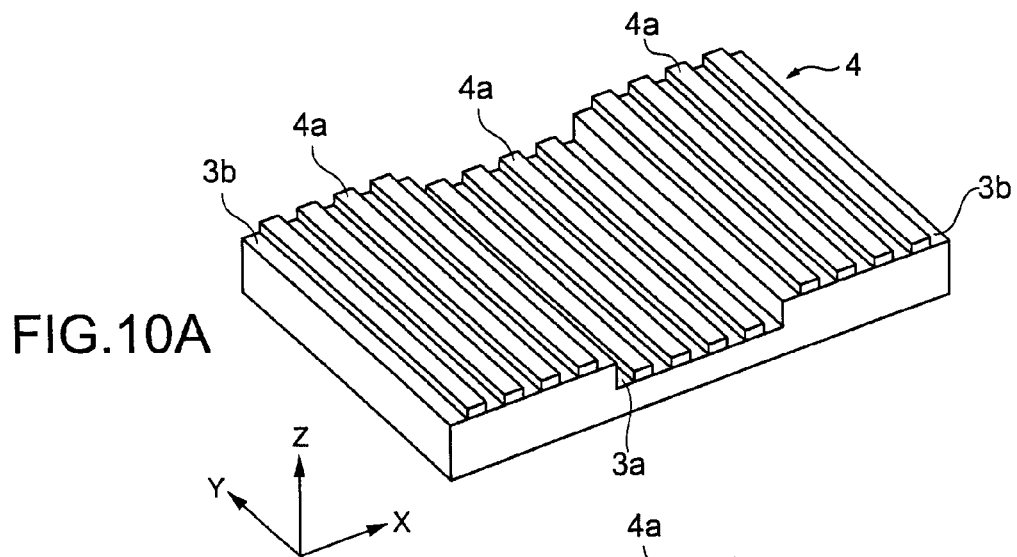
FIGS. 10A, 10B, and 10C are each a schematic perspective view shown by partially enlarging a portion of the diffractive structure with the grid according to different modifications of arrangements.
Figure 10B:
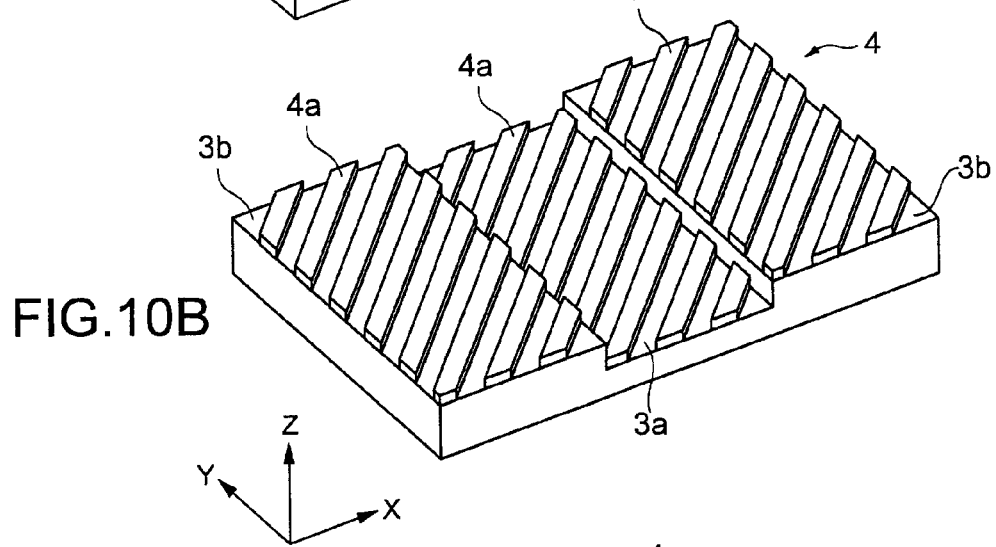
Figure 10C:
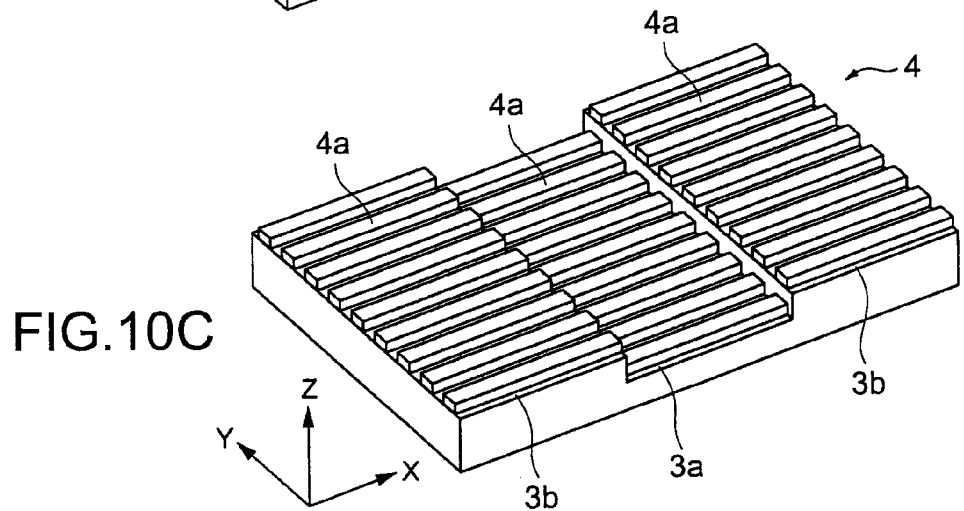

FIGS. 10A, 10B, and 10C are each a schematic perspective view shown by partially enlarging portion of the diffractive structure 3 with the grid 4. With reference to the FIGS. 10A to 10C, a description will be given of an arrangement relationship between the diffractive structure 3 and the grid 4. The mutual arrangement relationship therebetween can be formed as an example shown in FIG. 10A, for example. Specifically, in the example of FIG. 10A, the respective concave portions 3a and the respective convex portions 3b are extended in the Y direction shown in the drawing, as well as are alternately arranged in the X direction. Similarly, the respective fine lines 4a of the grid 4 are extended in the Y direction shown in the drawing, as well as are alternately arranged in the X direction.

In other words, the extending direction of the concave and the convex portions 3a, 3b is in parallel to the extending direction of the fine lines 4a.

Alternatively, in the mutual arrangement relationship between the diffractive structure 3 and the grid 4, preferably, the extending direction of the concave and the convex portions 3a, 3b intersects with the extending direction of the fine lines 4a at a predetermined angle, as shown in FIGS. 10B and 10C. Specifically, in an example of FIG. 10B, the respective concave portions 3a and the respective convex portions 3b are extended in the Y direction shown in the drawing, as well as are alternately arranged in the X direction. In contrast, the respective fine lines 4a of the grid 4 are extended in a direction intersecting with the Y direction in the drawing at an angle of approximately 45 degrees, as well as are alternately arranged in a direction orthogonal to the intersecting direction. In an example of FIG. 10C, the respective concave and the respective convex portions 3a and 3b are extended in the Y direction in the drawing, as well as are alternately arranged in the X direction. In contrast, the respective fine lines 4a of the grid 4 are extended in a direction intersecting with the Y direction in the drawing at an angle of approximately 90 degrees (namely, in the X direction), as well as are alternately arranged in a direction orthogonal to the intersecting direction (namely, in the Y direction). In this manner, intersecting the concave and the convex portions 3a, 3b with the fine lines 4a enables the fine lines 4a to be more easily formed near a region with the level difference between the concave and the convex portions 3a and 3b. An intersection angle between the extending direction of the concave and the convex portions 3a, 3b and the extending direction of the fine lines 4a may be determined as appropriate. The intersection angles 45 and 90 degrees in the above examples are preferable because those angles are often used in optical systems in general.

The optical element 1 of the present embodiment has the structure as above. Next will be described an example of a method for producing the optical element 1.

FIGS. 11A to 12C are schematic process views showing an example of the method for producing the optical element 1. The respective drawings show an enlarged portion of a section of the optical element 1.

Figure 11A:
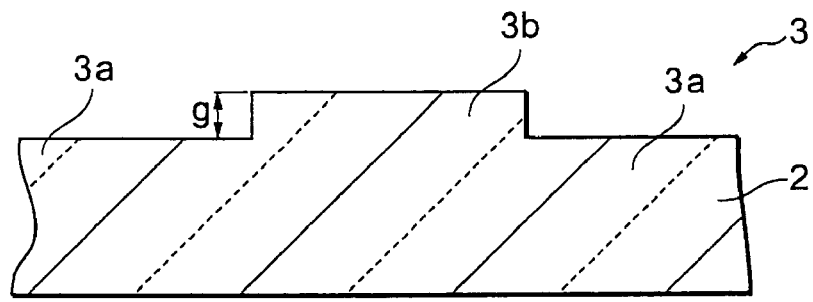
FIGS. 11A, 11B, and 11C are schematic process views showing an example of a method for producing the optical device according to the first embodiment.

First, there is formed the diffractive structure 3 including the concave and the convex portions 3a and 3b on the first surface of the substrate 2 (FIG. 11A). The present process can be performed using well-known techniques such as photolithography and etching, for example. Specifically, on the first surface of the substrate 2 is formed a photosensitive film (such as a resist film). Then, the photosensitive film is exposed to light through an exposure mask with an exposure pattern corresponding to the concave and the convex portions 3a and 3b to be developed. After that, the photosensitive film developed is used as an etching mask to perform dry etching or wet etching so as to form predetermined concave and convex shapes corresponding to the exposure pattern on the first surface of the substrate 2. For example, the substrate 2 may be a glass substrate as above and may have a plate thickness of 0.7 mm. The level difference between the concave portions 3a and the convex portions 3b (namely, the depth g of the diffractive structure 3) may be 100 nm, as above, for example. The depth g thereof is controlled depending on etching time or the like.

Figure 11B:
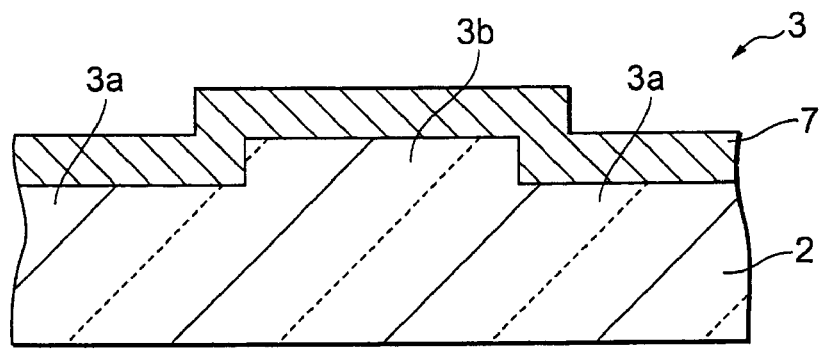

Next, on the first surface of the substrate 2 is formed a metal film 7 to cover the concave and the convex portions 3a and 3b (FIG. 11B). The metal film 7 is processed in a later process to be formed into each fine line 4a included in the above grid 4. For example, the metal film 7 may be an aluminum film, a silver film, a nickel film, or the like, and may have a thickness of approximately 120 nm. The metal film 7 formed as above can be obtained using a physical gas-phase deposition process such as vacuum evaporation or sputtering.

Figure 11C:
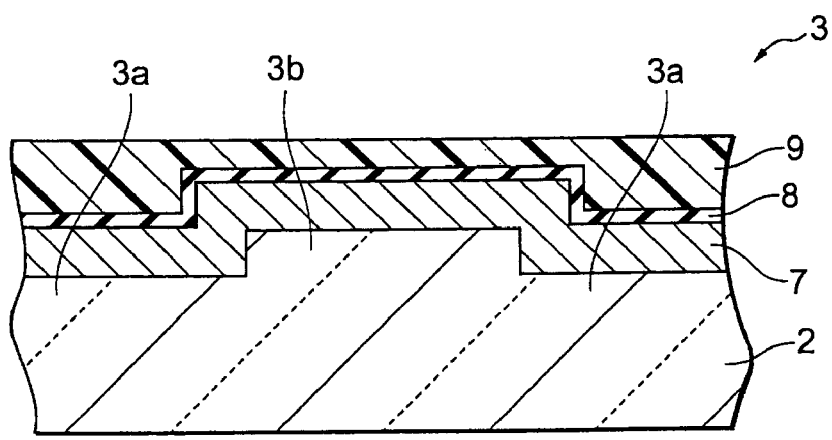

Next, on the first surface of the substrate 2 is formed an anti-reflective film 8 covering the metal film 7 (FIG. 11C). The anti-reflective film 8 is used to improve exposure precision when the photosensitive film is exposed to light in a later process. Examples of the anti-reflective film 8 include a silicon oxynitride (SiON) film, a tin oxide (SnO) film, and an indium tin oxide (ITO) film. The anti-reflective film 8 has a thickness of approximately a few tens nanometers. It is determined by a complex refractive index of a material forming a film whether the film can be used as the anti-reflective film. For example, preferably, a value of a real part of the complex refractive index is equal to or larger than $+1.4$ and a value of an imaginary part of the above index is in a range of approximately $-0.1$ to $-1.5$.

Then, there is formed a photosensitive film 9 covering the anti-reflective film 8 (or the metal film 7) on the first surface of the substrate 2 (FIG. 11C). The photosensitive film 9 is a negative or positive resist film. For example, the photosensitive film 9 may be formed by spin coating and may have a thickness determined according to needs. Preferably, the thickness of the photosensitive film 9 is determined so as to entirely cover a region overlapping with at least the concave and the convex portions 3a and 3b and so as to approximately flatten a film surface as shown in the drawing. In this case, a difference between the thickness of the photosensitive film 9 on an upper region of the diffractive structure 3 (a region corresponding to the convex portion 3b) and the thickness of the film 9 on a lower region of the diffractive structure 3 (a region corresponding to the concave portion 3a) is approximately equal to the depth g of the diffractive structure 3 described above.

Figure 12A:
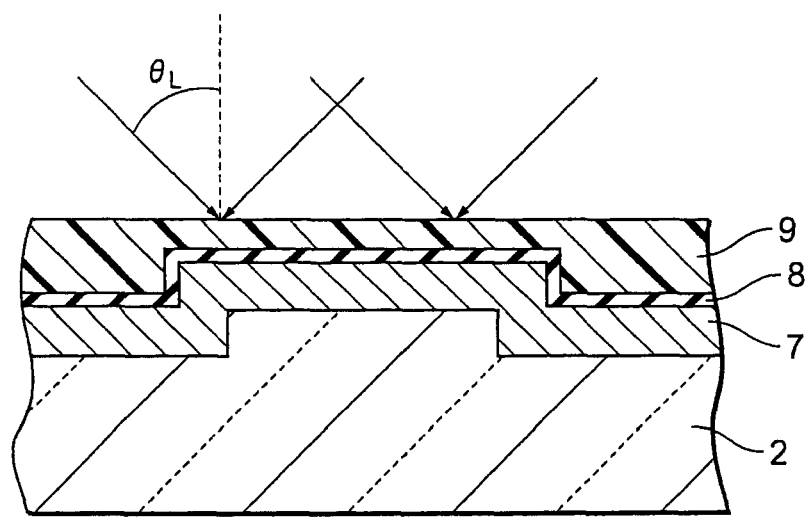
FIGS. 12A, 12B, and 12C are schematic process views showing the example of the method for producing the optical device according to the first embodiment.

Next, laser interference exposure is performed on the photosensitive film 9 formed on the first surface of the substrate 2 (FIG. 12A). A light source used for the laser interference exposure may be a deep ultra violet (DUV) laser used in a continuous oscillation mode with a wavelength of 266 nm, for example. Laser beam output from the laser is properly split into two laser beams to allow the two beams to intersect with each other at a predetermined angle θL, as shown in the drawing. This generates light (interference light) including interference fringes composed of cyclic bright and dark fringes. A pitch of the interference fringes (a cycle of the bright and the dark fringes) is determined by the above intersection angle θL. For example, when the intersection angle is set to 72 degrees, the pitch of the interference fringes can be 140 nm. Shedding interference fringes set as above onto the photosensitive film 9 allows a latent image pattern corresponding to the pitch of the interference fringes to be formed in the photosensitive film 9. In the production method, the anti-reflective film 8 is provided under the photosensitive film 9 as described above. Thus, the reflection of laser beams on the metal film 7 can be prevented and thereby exposure precision is guaranteed.

Figure 12B:
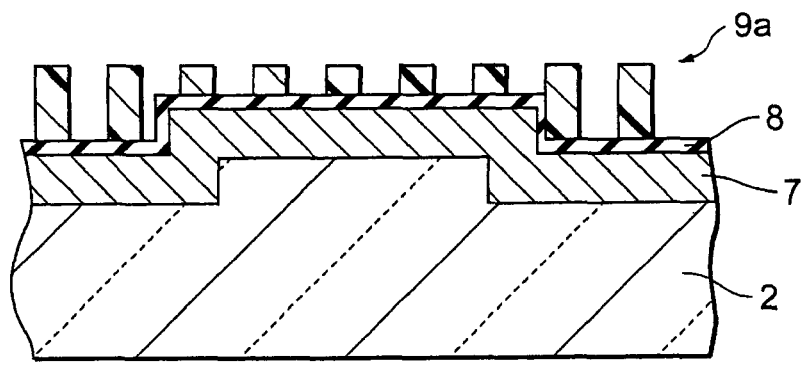

Next, there is developed the photosensitive film 9 that has the latent image pattern formed thereon by using the interference light (FIG. 12B). This results in formation of a photosensitive film pattern 9a having a cycle corresponding to the pitch of the interference fringes as shown in the drawing. For example, when the pitch of the interference fringes is 140 nm, the cycle of the photosensitive film pattern 9a is also approximately 140 nm.

Figure 12C:
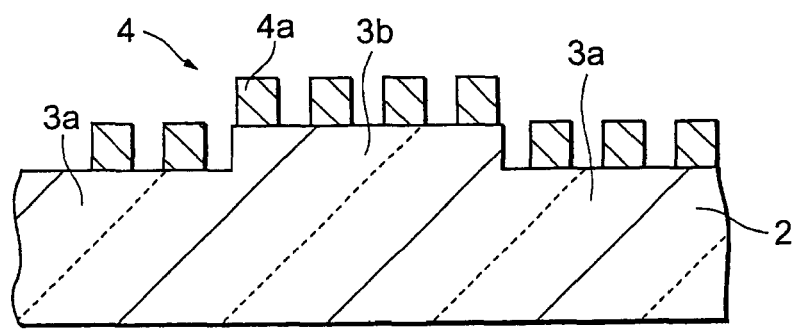

Then, etching such as dry etching is performed through the photosensitive film pattern 9a as a mask (FIG. 12C). Thereby, as shown in the drawing, the pattern of the photosensitive film pattern 9a is transferred to the anti-reflective film 8, and then, transferred to the metal film 7. Thereafter, the photosensitive film pattern 9a and the anti-reflective film 8 are removed. As a result, there is formed the grid 4 (namely, the respective fine lines 4a) along the surfaces of the concave and the convex portions 3a and 3b of the diffractive structure 3 on the first surface of the substrate 2, as shown in FIG. 12C.

In the foregoing producing method, preferably, between the anti-reflective film 8 and the metal film 7 is formed an $SiO_2$ film having an extremely small thickness (e.g. approximately 20 nm). This can further improve an etching selection ratio with respect to the metal film 7, thereby enabling the thickness of the photosensitive film 9 to be smaller. This means that the latent image pattern becomes shallow, which is more advantageous in terms of stabilizing exposure. In this case, after forming the anti-reflective film 8 as above, the $SiO_2$ film may be formed before formation of the metal film 7. The $SiO_2$ film can be formed by a chemical gas phase deposition process, for example. Alternatively, formation of the anti-reflective film 8 may be omitted depending on processing conditions or the like.

The optical element 1 of the above embodiment can be incorporated in various liquid crystal devices. Hereinafter, a liquid crystal light valve will be described as an example of the liquid crystal devices.

Figure 13A:
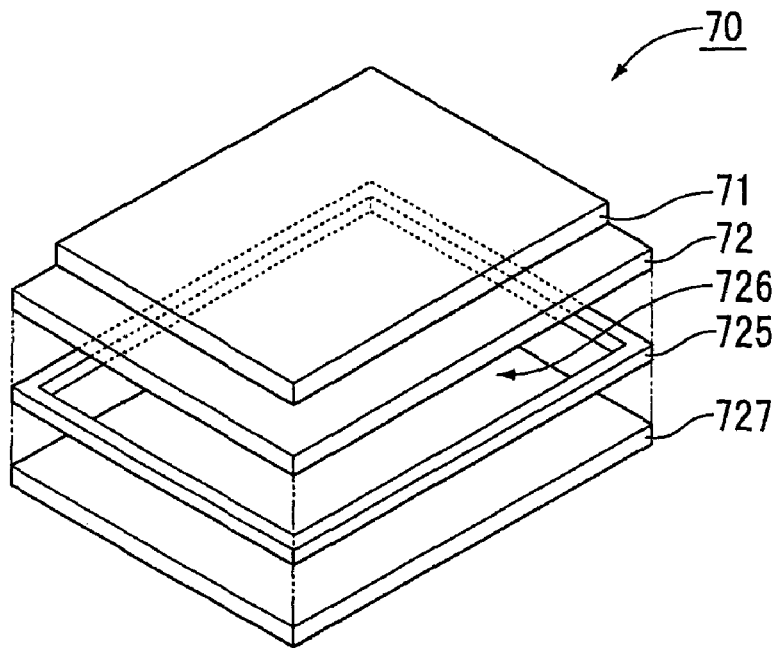
FIGS. 13A and 13B are each a schematic view showing a structural example of a liquid crystal device according to an embodiment of the invention.
Figure 13B:
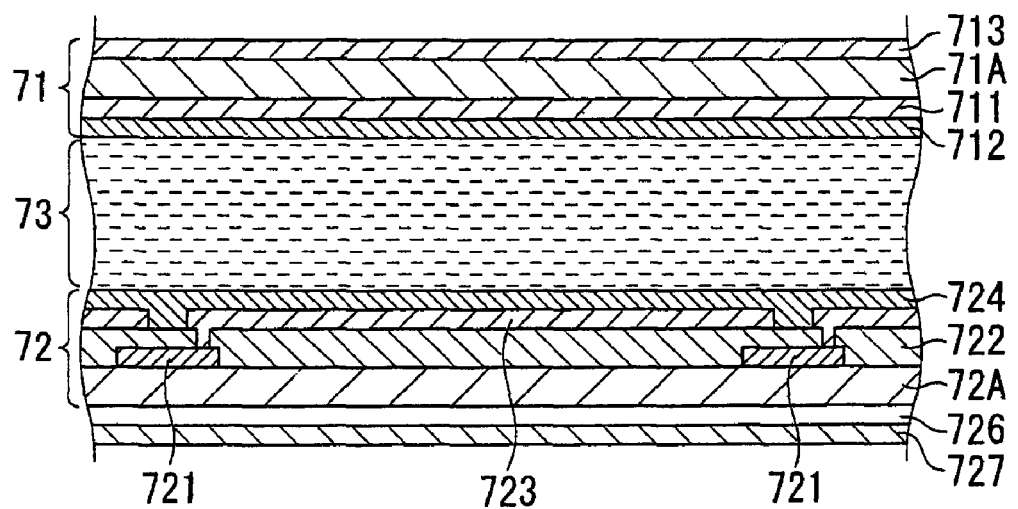

FIGS. 13A and 13B are each a schematic view showing a structural example of a liquid crystal device including the optical element of the first embodiment. FIG. 13A is a schematic perspective view of a liquid crystal light valve (a liquid crystal device) 70, and FIG. 13B is a sectional view of a main part of the liquid crystal device 70.

As shown in FIG. 13A, the liquid crystal light valve 70 includes a first substrate 71 arranged on an incidence side and a second substrate 72 arranged on an emission side. As shown in FIG. 13B, between the first substrate 71 and the second substrate 72 is provided a liquid crystal layer 73. On an opposite side of the second substrate 72 from the liquid crystal layer 73 is bonded to an optical element 727 via a sealing member 725. The optical element 727 is configured by including the optical element 1 of the first embodiment. The sealing member 725 is a frame-like member and two-dimensionally superimposed with a peripheral portion of the second substrate 72. Provided between the second substrate 72 and the optical element 727 is a gap 726, which is a region surrounded by the frame-like sealing member 725. The gap 726 is airtightly sealed so as to inhibit entry of dust.

The first substrate 71 is formed of a transparent substrate 71A made of glass, quartz, or the like, as a base body. Provided on a side of the transparent substrate 71A toward the liquid crystal layer 73 is a common electrode 711. Provided between the common electrode 711 and the liquid crystal layer 73 is an alignment film 712 controlling an alignment condition of the liquid crystal layer 73. Provided on an opposite side of the transparent substrate 71A from the liquid crystal layer 73 is a polarizing plate 713.

For example, the second substrate 72 is of an active matrix type and is formed of a transparent substrate 72A made of glass, quartz, or the like, as a base body. Provided on a side of the transparent substrate 72A toward the liquid crystal layer 73 is a thin film transistor (hereinafter referred to as TFT) 721 serving as a switching element.

For example, the TFT 721 is formed by using a polycrystalline silicon process. A source region of the TFT 721 is electrically connected to a signal source supplying an image signal via a data line (not shown). A gate electrode of the TFT 721 is electrically connected to a signal source supplying a scanning signal via a scanning line (not shown).

An interlayer insulating film 722 is provided so as to cover the TFT 721. Provided on a region of the interlayer insulating film 722 overlapping with a pixel is a pixel electrode 723 having an island shape. Additionally, the interlayer insulating film 722 has a contact hole formed therein, and the pixel electrode 723 is electrically connected to a drain region of the TFT 721 via the contact hole. Provided between the pixel electrode 723 and the liquid crystal layer 73 is an alignment film 724 controlling the alignment condition of the liquid crystal layer 73. On an opposite side of the transparent substrate 72A from the liquid crystal layer 73 is provided the optical element 727 via the gap 726. In the optical element 727, the depths of concave and convex portions are adjusted such that the zero-order reflective diffraction efficiency of a TE-polarized component is a minimum.

In the liquid crystal light valve 70 structured as above, a scanning signal is supplied to the gate electrode of the TFT 721 to turn on the transistor. When the TFT 721 is turned on, an image signal is sent to the pixel electrode 723 via the data line and the TFT 721. Then, a voltage corresponding to the image signal is applied between the pixel electrode 723 and the common electrode 712, whereby an electric field is applied to the liquid crystal layer 73 in each pixel. This allows an azimuth of liquid crystal molecules of the liquid crystal layer 73 to be controlled in response to the applied electric field.

Meanwhile, light incident to the first substrate 71 from a not-shown light source passes through the polarizing plate 713, whereby the light is turned into predetermined polarized light (such as linearly polarized light) to be input to the liquid crystal layer 73. A polarized state of the light incident to the liquid crystal layer 73 is changed according to the azimuth of the liquid crystal molecules. Then, for example, the light is turned into linearly polarized light in a direction different from that of the light input to the liquid crystal layer to be input to the second substrate 72. The light incident to the second substrate 72 is transmitted through the gap 726 to be input to the optical element 727. A TE-polarized component of the light input to the optical element 727 is reflected by the optical element 727, whereas a TM-polarized component of the light input is transmitted through the optical element 727. The light transmitted therethrough becomes light having a gradation corresponding to an image signal by splitting the TM-polarized component.

In the TE-polarized component reflected by the optical element 727, it is adapted that zero-order diffracted light has a minimum intensity as described above. Additionally, first-order or higher order diffracted light is totally reflected at an interface between the gap 726 and the optical element 727. Accordingly, most of the TE-polarized component is inhibited from passing through the gap 726, thereby significantly reducing re-entry of reflected light as the TE-polarized component to the second substrate 72. This can prevent negative influences such as malfunction of TFT 721 due to the reflected light entering it, generation of heat due to the reflected light absorbed between the first and the second substrates 71 and 72, and reduction of contrast due to interference between the light input to the first substrate 71 from the light source and the reflected light.

Furthermore, the gap 726 between the second substrate 72 and the optical element 727 is airtightly sealed to inhibit dust from entering the gap, thereby preventing light passing through the gap 726 from causing shadows of dust particles. Consequently, there is no need for dust-proof glass or the like to prevent entry of dust, which enables miniaturization of the liquid crystal light valve 70. In addition, providing the gap 726 between the second substrate 72 and the optical element 727 allows heat of the optical element 727 to be hardly transmitted to the second substrate 72, thus improving heat resistance of the liquid crystal light valve 70.

The above embodiment has described the structure in which the TE-polarized light is reflected and the TM-polarized light is used for image formation. However, conversely, the TM-polarized light may be reflected, whereas the TE-polarized light may be used to form an image. Furthermore, as a liquid crystal device that can use the optical element of the first embodiment, besides the foregoing liquid crystal light valve, for example, there may be mentioned a liquid crystal device used in a direct-view liquid crystal display, for example.

The optical element 1 of the first embodiment may be incorporated in various optical devices. Hereinafter, as an example of the optical devices, a description will be given of a projection display (a liquid crystal projector) using a liquid crystal light valve. In the example, unlike the liquid crystal device described above, the optical element 1 is provided independently from the liquid crystal light valve.

FIG. 14 is a schematic view of a structural example of a projection display including the optical element of the first embodiment. FIG. 14 shows only a single optical system to explain a principle structure. The display shown in FIG. 14 includes a light source 50 such as a mercury lamp, an optical element 51, a liquid crystal light valve (a liquid crystal panel) 52, an optical element 53, a pupil 54a, and a projection lens 54. A single-dotted chain line in the drawing indicates an optical path of light emitted from the light source 50. Sequentially arranged on the optical path are the optical element 51, the liquid crystal light valve 52, the optical element 53, and the projection lens 54. The projection display employs the optical element 1 of the first embodiment, as at least the optical element 53.

The optical element 51 has the polarized beam splitting function. Specifically, when light from the light source 50 is incident to the optical element 51, only one of polarized components of the incident light is transmitted through the element and the other one of the components is not transmitted therethrough. For example, the optical element 51 is a polarizing plate of a polymeric type obtained by uniaxially stretching resin, or the like. Alternatively, the optical element 51 may be formed by providing a plurality of fine lines on a transparent substrate, as in the grid 4 described above. The optical element structured as above has an excellent light resistance. Thus, the optical element reflects a polarized component parallel to the fine lines in the incident light and transmits a polarized component orthogonal to the fine lines.

The liquid crystal light valve 52 includes a liquid crystal material (a liquid crystal layer) provided between two mutually opposing transparent substrates. In the liquid crystal light valve 52, a voltage is appropriately applied to the liquid crystal material through an electrode disposed on each of the transparent substrates so as to control the alignment condition of liquid crystal molecules. Controlling the alignment condition of the liquid crystal molecules enables a polarization condition of light transmitted through the optical element 51 to be changed according to needs. Based on the change in the polarization condition of the light, there is formed an image that is to be projected on a screen 60. In short, the liquid crystal light valve 52 serves as a light modulating device (a light modulating mechanism).

The optical element 53 is the optical element according to the first embodiment as described above. A first surface 53a of the optical element 53 having the diffractive structure and the grid (not shown) thereon is positioned on a succeeding stage side of the element 53 on the optical path. Additionally, a second surface 53b of the optical element 53 that does not have the diffractive structure and the like thereon is positioned on a preceding stage of the element 53 on the path (on a side of the optical element 53 toward the light source 50). Arranging the first and the second surfaces 53a and 53b as above allows a TE-polarized component of the light transmitted through the optical element 53 to be diffracted and totally reflected as described above. Then, the TE-polarized component is propagated through an inside of the substrate of the optical element 53 to be directed toward ends of the substrate. This significantly reduces an amount of light returning to the liquid crystal light valve 52, thereby enabling prevention of problems such as a malfunction of the liquid crystal light valve 52.

The foregoing optical element 51 may also be the optical element according to the first embodiment. In this case, the optical element 51 is arranged in the same manner as in the optical element 53. Specifically, a first surface 51a of the optical element 51 having the diffractive structure and the grid (not shown) thereon is positioned on a succeeding stage side of the element 51 on the optical path (on a side of the optical element 51 facing the liquid crystal light valve 52), as well as a second surface 51b thereof that does not have the diffractive structure and the like thereon is positioned on a preceding stage side of the element 51 on the path (on a side of the element 51 toward the light source 50).

An image formed by the optical element 51, the liquid crystal light valve 52, and the optical element 53 is input to the projection lens 54 via the pupil 54a and then enlarged by the lens to be provided on the screen 60, resulting in display of the enlarged image on the screen 60.

Figure 15:
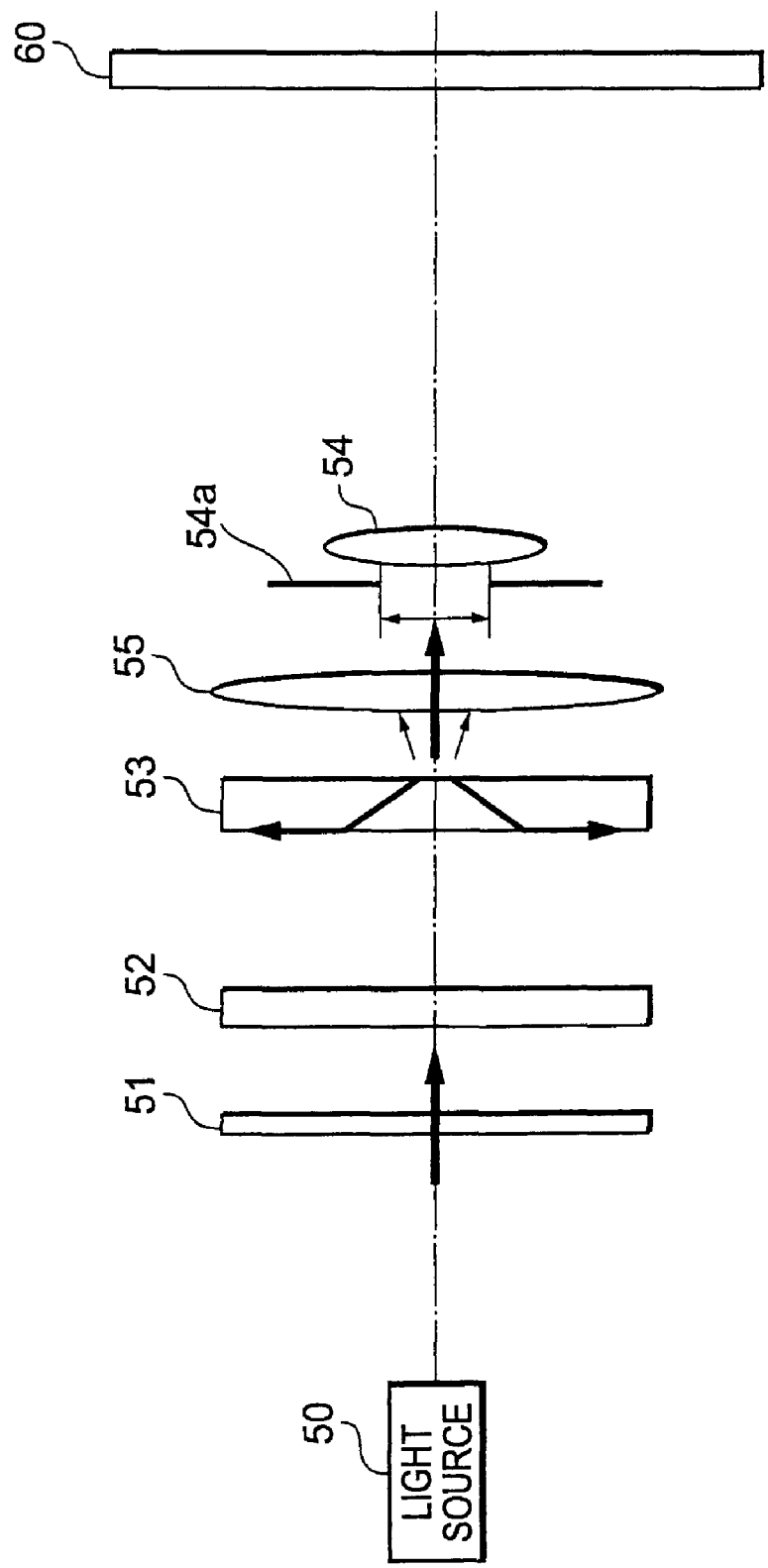
FIG. 15 is a schematic view showing a structural example of a projection display according to another embodiment of the invention.

FIG. 15 is a schematic view showing a modification of the optical system shown in FIG. 14. Constituent elements common between the drawings are denoted by the same reference numerals, and thus descriptions thereof will be omitted. A projection display shown in FIG. 15 further includes a field lens 55. The field lens 55 is arranged at a preceding stage of the projection lens 54 on the succeeding stage side of the optical element 53 on the optical path, namely arranged between the optical element 53 and the projection lens 54. Using the field lens 55 enables more transmitted and diffracted light to be collected to the pupil 54a of the projection lens 54, thus further increasing brightness (luminance) of the image on the screen 60.

Next will be described structural examples of projection displays each having three optical systems, as other application examples of the foregoing projection display. In each of the application examples below, constituent elements common between the displays of FIGS. 14 and 16 are denoted by the same reference numerals, and thus detailed descriptions thereof will be omitted.

Figure 16:
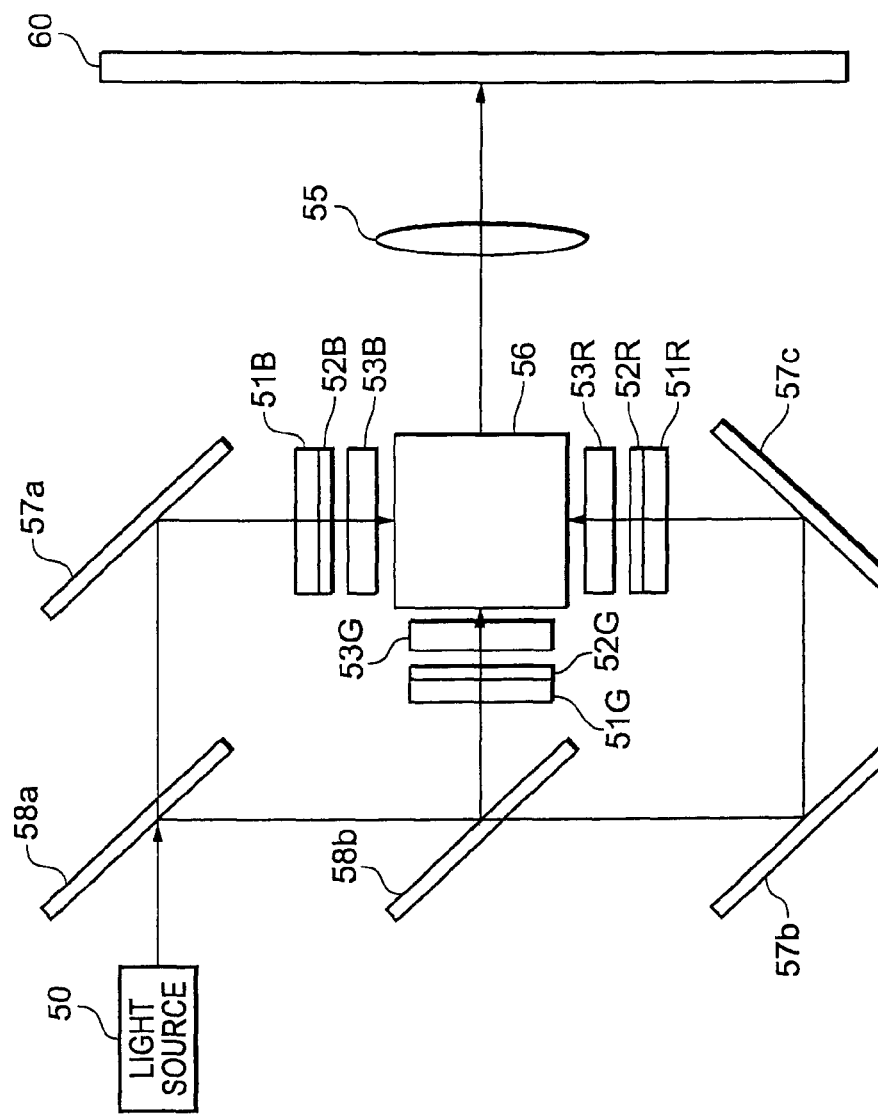
FIG. 16 is a schematic view showing a structural example of a projection display having three optical systems according to an embodiment of the invention.

FIG. 16 is a schematic view showing a structural example of a projection display having three optical systems according to an embodiment of the invention. As shown in FIG. 16, in the projection display, on a first surface of four surfaces of a prism (a light-synthesizing unit) 56 are opposingly arranged an optical element 51B, a liquid crystal light valve 52B, and an optical element 53B; on a second surface of the four surfaces of the prism 56 are opposingly arranged an optical element 51G, a liquid crystal light valve 52G, and an optical element 53G; and on a third surface of the four surfaces thereof are opposingly arranged an optical element 51R, a liquid crystal light valve 52R, and an optical element 53R.

In the projection display structured as above, light output from the light source 50 is input to a dichroic mirror 58a. Of the incident light, a blue component is transmitted through the dichroic mirror 58a, and other components are reflected. The blue component (hereinafter referred to as "blue light") transmitted through the dichroic mirror 58a is reflected by a mirror 57a and input to the optical element 51B. Then, the blue light input is appropriately modulated by the liquid crystal light valve 52B and transmitted through the optical element 53B to be input to a first surface of the prism 56. Meanwhile, the components of the light reflected by the dichroic mirror 58a are input to a dichroic mirror 58b. Of the light components input, a red component is transmitted through the dichroic mirror 58b, whereas a green component is reflected by the dichroic mirror 58b. The transmitted red component (hereinafter referred to as "red light") is reflected by a mirror 57b and then a mirror 57c to be input to the optical element 51R. The input red component is appropriately modulated by the liquid crystal light valve 52R and transmitted through the optical element 53R to be input to a second surface of the prism 56. The reflected green component (hereinafter referred to as "green light") is input to the optical element 51G. The input green light is appropriately modulated by the liquid crystal light valve 52G and transmitted through the optical element 53G to be input to a third surface of the prism 56. The prism 56 synthesizes the blue light, the green light, and the red light, respectively, input to the respective three surfaces of the prism to emit from a fourth surface thereof. The projection lens 55 enlarges the synthesized light emitted from the fourth surface of the prism 56 to project on the screen 60.

In FIG. 16, the optical elements 51R, 51G, and 51B correspond to the optical element 51 of the above embodiment shown in FIG. 15; the liquid crystal light valves 52R, 52G, and 52B correspond to the liquid crystal light valve 52 of the above embodiment; and the optical elements 53R, 53G, and 53B correspond to the optical element 53 of the above embodiment. A first surface of each of the optical elements 53R, 53G, and 53B having the diffractive structure and the grid thereon is positioned on a succeeding stage side of the each optical element on an optical path (a side facing the prism), and a second surface of each thereof is positioned on a preceding stage side of the each element on the optical path (a side facing the liquid crystal light valve). Additionally, when the diffractive structure and the grid are also included in the optical elements 51R, 51G, and 51B, a first surface of each of the optical elements 51R, 51G, and 51B having the diffractive structure and the grid thereon is positioned on a succeeding stage side of the each optical element on the optical path (the side of the each element facing the liquid crystal light valve), and a second surface of each thereof is positioned on a preceding stage side of the each element on the optical path (a side thereof facing the mirror or the dichroic mirror).

Figure 17:
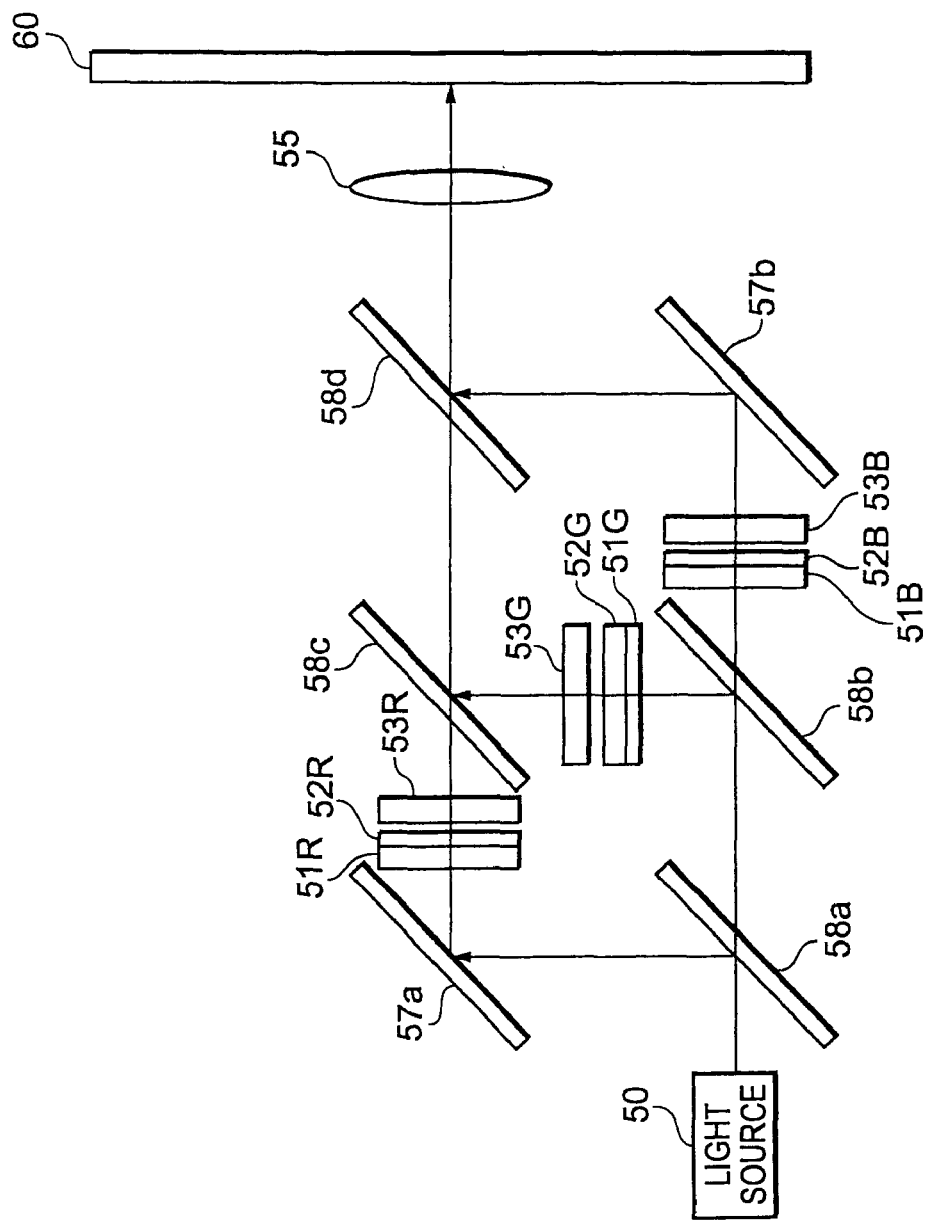
FIG. 17 is a schematic view showing a structural example of a projection display having three optical systems according to another embodiment of the invention.

FIG. 17 is a schematic view showing a structural example of a projection display having three optical systems according to another embodiment of the invention. The structural example is of a projection display not including a prism, unlike the display shown in FIG. 16.

In the projection display of FIG. 17, light output from the light source 50 is input to the dichroic mirror 58a. Of the incident light, only a red component is reflected and other respective components are transmitted through the dichroic mirror 58a. The transmitted components are input to the dichroic mirror 58b. Of the input light, a green component (green light) is reflected, whereas a blue component (blue light) is transmitted through the dichroic mirror 58b. The transmitted blue light is input to the optical element 51B and appropriately modulated by the liquid crystal light valve 52B. The modulated blue light is transmitted through the optical element 53B to be input to the mirror 57b. The blue light input to the mirror 57b is reflected and input to a dichroic mirror 58d. After being reflected by the mirror 58d, the blue light is input to the projection lens 55. Meanwhile, the red light reflected by the dichroic mirror 58a is input to the mirror 57a and reflected by the mirror. The red light reflected by the mirror 57a is input to the optical element 51R, and then appropriately modulated by the liquid crystal light valve 52R. The modulated red light is transmitted through the optical element 53R to be input to the dichroic mirror 58c. The red light input to the dichroic mirror 58c is transmitted through the dichroic mirror 58c to be input to the dichroic mirror 58d. Then, the red light input to the dichroic mirror 58d is transmitted through the dichroic mirror 58d to be input to the projection lens 55. Additionally, the green light reflected by the dichroic mirror 58b is input to the optical element 51G and appropriately modulated by the liquid crystal light valve 52G. The modulated green light is transmitted through the optical element 53G to be input to the dichroic mirror 58c, and then reflected by the dichroic mirror 58c to be input to the dichroic mirror 58d. After transmitting through the dichroic mirror 58d, the green light is input to the projection lens 55. In this manner, beams of the blue light, the green light, and the red light are finally synthesized into a synthesized light beam. Then, the synthesized light beam (the light obtained by synthesizing the blue light, the green light, and the red light) is input to the projection lens 55 is enlarged by the projection lens 55 to be projected on the screen 60.

In the present example, similarly, the optical elements 51R, 51G, and 51B correspond to the optical element 51 of the above embodiment; the liquid crystal light valves 52R, 52G, and 52B correspond to the liquid crystal light valve 52 of the above embodiment; and the optical elements 53R, 53G, and 53B correspond to the optical element 53 of the above embodiment. A first surface of each of the optical elements 53R, 53G, and 53B having the diffractive structure and the grid thereon is positioned on a succeeding stage side of the each optical element on an optical path (a side of the element facing the mirror or the dichroic mirror), and a second surface of each thereof is positioned on a preceding stage side of the each element on the optical path (a side of the element facing the liquid crystal light valve). Additionally, when the diffractive structure and the grid are also included in the optical elements 51R, 51G, and 51B, a first surface of each of the optical elements 51R, 51G, and 51B having the diffractive structure and the grid thereon is positioned on the succeeding stage side of the each optical element on the optical path (the side of the element facing the liquid crystal light valve), and a second surface of each thereof is positioned on the preceding stage side of the each element on the optical path (the side of the element facing the mirror or the dichroic mirror).

Preferably, each of the projection displays of the embodiments shown in FIGS. 16 and 17 also further includes a field lens (See FIG. 15). Additionally, in the projection display of each of the embodiments, the light source 50 may be a laser light source. In this case, a wavelength width of laser light is extremely small, thus further improving light controllability by the optical element according to the each embodiment.

Furthermore, in each of the optical elements, it is also preferable to optimize the structure of the diffractive structure with the grid according to a wavelength $\lambda$ of light corresponding to the each optical element. For example, in the optical system shown in FIG. 16 or 17, the wavelength $\lambda$, may be set to 450, 550, and 650 nm, respectively, in the optical element 53B corresponding to the blue light, the optical element 53G corresponding to the green light, and the optical element 53R corresponding to the red light, respectively. Then, using the foregoing relational expressions (1) to (12) enables the structure of the each optical element to be optimized for each wavelength.

In this manner, in the optical element according to the embodiment, one of polarized components in the incident light is reflected and the other polarized component is transmitted through by the mechanism of the grid. In addition, the reflected polarized component (the reflected light) is diffracted at a sufficiently large angle by the mechanism of the diffractive structure. Satisfying the foregoing relationships among the parameters allows the diffracted reflected light to be totally reflected at an interface between the second surface of the substrate and a medium (such as air) around the second surface of the substrate. The reflected light is then propagated through the inside of the substrate and directed toward ends of the substrate. Accordingly, using the optical elements according to the embodiments of the invention in a desired optical system allows light reflected by the grid not to be returned to the preceding stage side on the optical path, thus enabling inhibition of negative influence of unnecessary reflected light.

Furthermore, in the respective projection displays of the present embodiments, the foregoing optical element having the diffractive structure and the grid is used as at least an optical element provided at the succeeding stage side of the liquid crystal light valve. This can prevent light reflected by the grid to be input to the liquid crystal light valve. Thus, operation of the liquid crystal light valve is not destabilized by incidence of unnecessary light. In addition, the grid composed of the metal fine wires is used as the polarized beam splitting element, thereby realizing a display having an excellent light resistance. Accordingly, the embodiments of the invention can provide a high-performance display. Furthermore, when the foregoing optical element having the diffractive structure and grid is also used as an optical element provided at the preceding stage side of the liquid crystal light valve, there can provide a display with higher performance and higher quality.

The present invention is not restricted to the embodiments described above and is embodied with various modifications, without departing from the spirit and scope of the invention.

Figure 18:
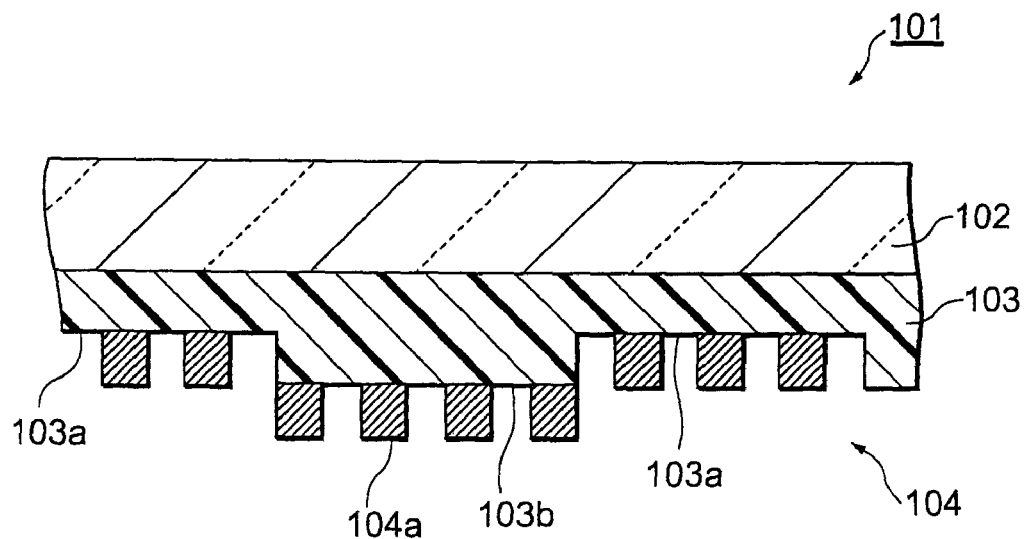
FIG. 18 is a schematic view showing a sectional structure of an optical element according to a second embodiment of the invention.
Figure 19:
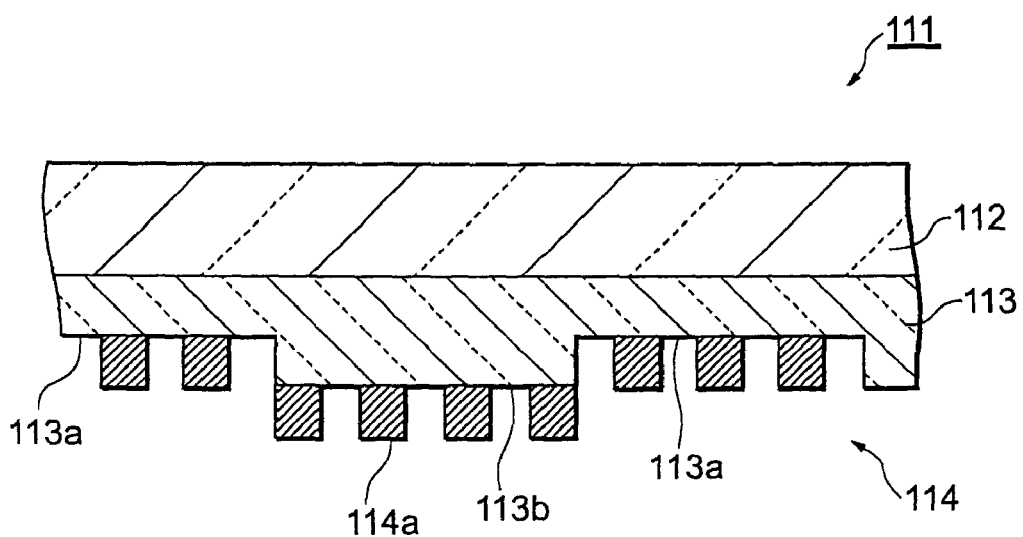
FIG. 19 is a schematic view showing a sectional structure of an optical element according to a third embodiment of the invention.

For example, in the above embodiments, processing such as etching is performed on the first surface of the substrate to form the diffractive structure. However, another producing method can be employed. Specifically, a polymeric film (a high polymer resin film) is formed on the first surface of the substrate to perform photo-mask exposure and wet etching on the polymer film, thereby forming the same optical element as the above. FIG. 18 shows a structural example of an optical element formed by the method. In an optical element 101 shown in FIG. 18, a diffractive structure 103 composed of a polymer film is arranged on a first surface of the substrate 102 made of glass or the like. The diffractive structure 103 includes concave portions 103a and convex portions 103b, and a grid 104 composed of a plurality of fine lines 104a is arranged along surfaces of the concave and the convex portions 103a and 103b. Besides this, a substrate having the diffractive structure may be integrally formed by using a refractive index glass (n=approximately 2.0) enabling shape molding. In this case, due to the high refractive index of the glass, the depth g of the diffractive structure can be made smaller. Thus, preferably, the glass is used to form the grid. In addition, another film (such as an inorganic film made of $SiO_2$) may be formed on the substrate to perform selective etching on the film, thereby forming the diffractive structure. FIG. 19 shows a structural example of an optical element formed by the above method. In an optical element 111 shown in FIG. 19, on a first surface of a substrate 112 made of glass or the like is arranged a diffractive structure 113 composed of a film made of $SiO_2$ or the like. The diffractive structure 113 includes concave portions 113a and convex portions 113b. Along surfaces of the concave and the convex portions 113a and 113b is arranged a grid 114 including a plurality of fine lines 114a.

Still furthermore, in the foregoing embodiments, the projection displays have been exemplified as some of application examples of the optical element according to the embodiments. However, the application examples of the optical element according to the embodiments are not restricted to them. The projection display is an example of the optical devices including the optical element according to the embodiments. Other than this, the optical element according to the embodiments can also be applied to liquid crystal displays requiring a polarized beam splitting layer, for example. It should be obvious that applications of the optical element according to the embodiments are not restricted to optical devices for display and can be made in various optical devices in general, requiring the polarized beam splitting function.

What is claimed is:

1. An optical element comprising:
    a substrate transmitting at least a component of an incident light;
    a diffractive structure that includes a plurality of concave portions and a plurality of convex portions alternately arranged with each other, and that is provided on a first surface of the substrate; and
    a grid that includes a plurality of fine lines extending in a single direction and that is provided along a top surface of the diffractive structure on the first surface of the substrate, wherein conditions: $d<\lambda$ and $\lambda/n<\delta\leq\lambda$ are satisfied when $\lambda$ represents a wavelength of the incident light; d represents a mutual distance between the fine lines; $\delta$ represents a distance between the neighboring convex portions; and n represents a refractive index of a material forming the substrate.

2. The optical element according to claim 1, wherein a height gap between the concave portions and the convex portions of the diffractive structure is set to a value of $(2m+1)\lambda/4n$, when m is integer, 0 or over.

3. The optical element according to claim 1, wherein an extending direction of each of the concave and the convex portions of the diffractive structure is approximately parallel to an extending direction of each of the fine lines of the grid.

4. The optical element according to claim 1, wherein an extending direction of each of the concave and the convex portions of the diffractive structure intersects an extending direction of each of the fine lines of the grid.

5. The optical element according to claim 1, further including a light-attenuating portion arranged at each side adjacent to an end of the substrate.

6. The optical element according to claim 1, wherein a condition: $\theta>\tan^{-1}(W/2T)$ is satisfied when T represents a thickness of the substrate in a direction normal to the first surface; W represents a width of the substrate in a direction in which first-order diffracted light by the diffractive structure is guided inside the first surface; and $\theta$ represents a diffraction angle between the first-order diffracted light by the diffractive structure and the normal-line direction.

7. The optical element according to claim 1, further including a coverage layer that fills the height gap between the concave and the convex portions on the first surface of the substrate and has a refractive index approximately equal to a refractive index of the substrate.

* * * * *